United States Patent
Matsumoto et al.

(10) Patent No.: US 10,948,099 B2
(45) Date of Patent: Mar. 16, 2021

(54) MOTOR OPERATED VALVE

(71) Applicant: TGK CO., LTD., Tokyo (JP)

(72) Inventors: Michio Matsumoto, Tokyo (JP); Shinji Saeki, Tokyo (JP); Youichi Miura, Tokyo (JP); Tomohiro Yuasa, Tokyo (JP)

(73) Assignee: TGK CO., LTD., Tokyo (JP)

( * ) Notice: Subject to any disclaimer, the term of this patent is extended or adjusted under 35 U.S.C. 154(b) by 0 days.

(21) Appl. No.: 16/781,476

(22) Filed: Feb. 4, 2020

(65) Prior Publication Data

US 2020/0263800 A1 Aug. 20, 2020

(30) Foreign Application Priority Data

Feb. 14, 2019 (JP) .............................. JP2019-024319
Jun. 14, 2019 (JP) .............................. JP2019-111263

(51) Int. Cl.
*F16K 31/04* (2006.01)

(52) U.S. Cl.
CPC .... *F16K 31/047* (2013.01); *F25B 2341/0653* (2013.01)

(58) Field of Classification Search
CPC .................. F16K 31/047; F25B 2341/0653
See application file for complete search history.

(56) References Cited

U.S. PATENT DOCUMENTS 9,803,770 B2 * 10/2017 Takahashi ............. F16K 3/0254

FOREIGN PATENT DOCUMENTS

| EP | 3293470 A1 | 3/2018 |
|----|------------|--------|
| JP | H-06241338 A | 8/1994 |
| JP | H10-047517 | 2/1998 |
| JP | 2010043727 A | 2/2010 |

OTHER PUBLICATIONS

European Search Report dated Jun. 22, 2020 in EP Application No. 20156915.9.

* cited by examiner

*Primary Examiner* — Eric Keasel
(74) *Attorney, Agent, or Firm* — Muncy, Geissler, Olds & Lowe, P.C.

(57) ABSTRACT

A motor operated valve includes a feed screw mechanism and a stopper mechanism. The feed screw mechanism includes a guiding part including an external thread portion on an outer surface thereof, and a guided part that is a cylindrical member constituting a rotation shaft of a rotor, and including an internal thread portion, which is engaged with the external thread portion, on an inner surface thereof. The stopper mechanism includes a stopper portion provided on the guided part, and a stopping face formed integrally with the guiding part. When a valve element is driven by the motor to move in a valve closing direction, the stopping face stops the stopper portion to restrict the movement of the rotor in the valve closing direction.

5 Claims, 20 Drawing Sheets

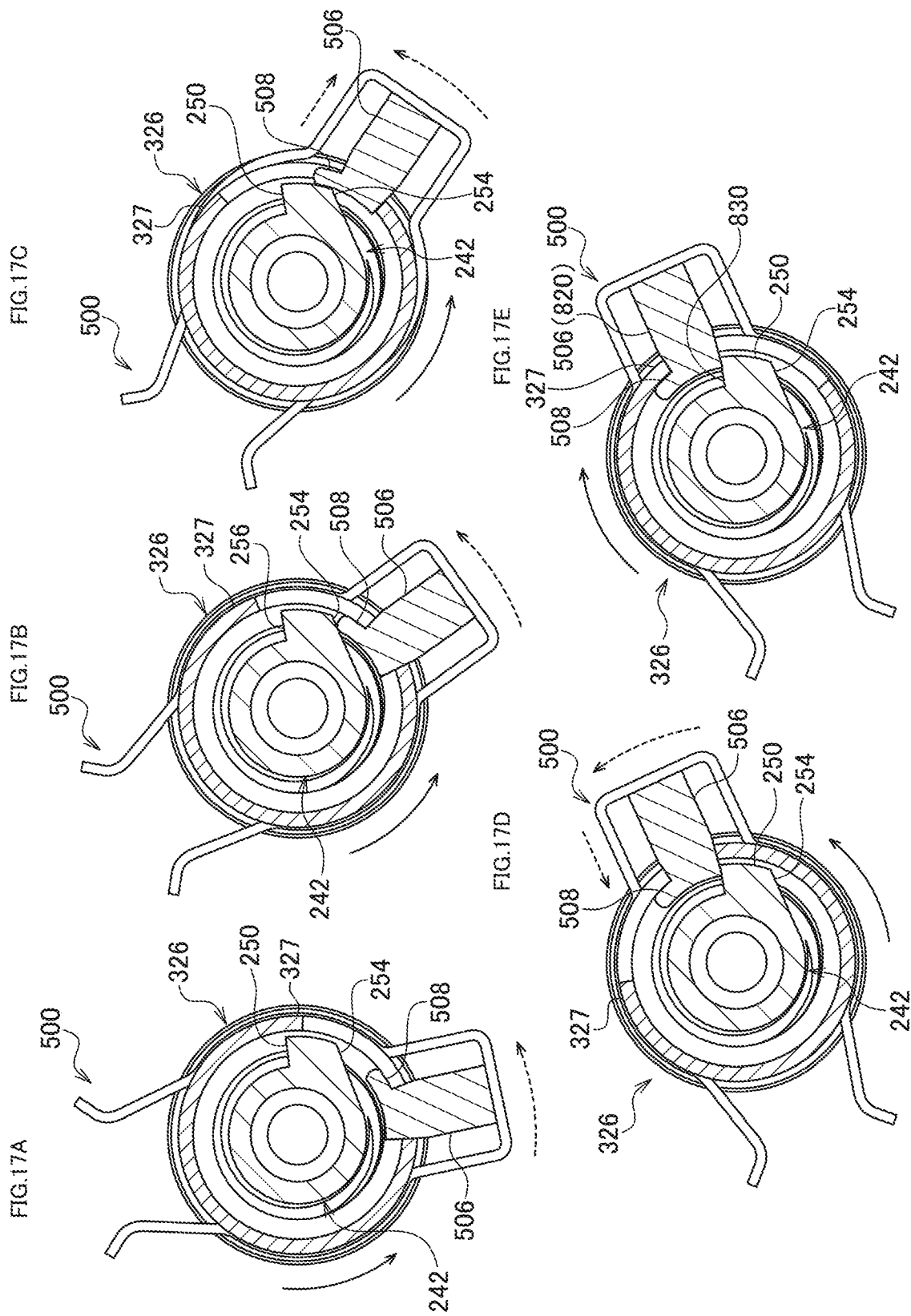

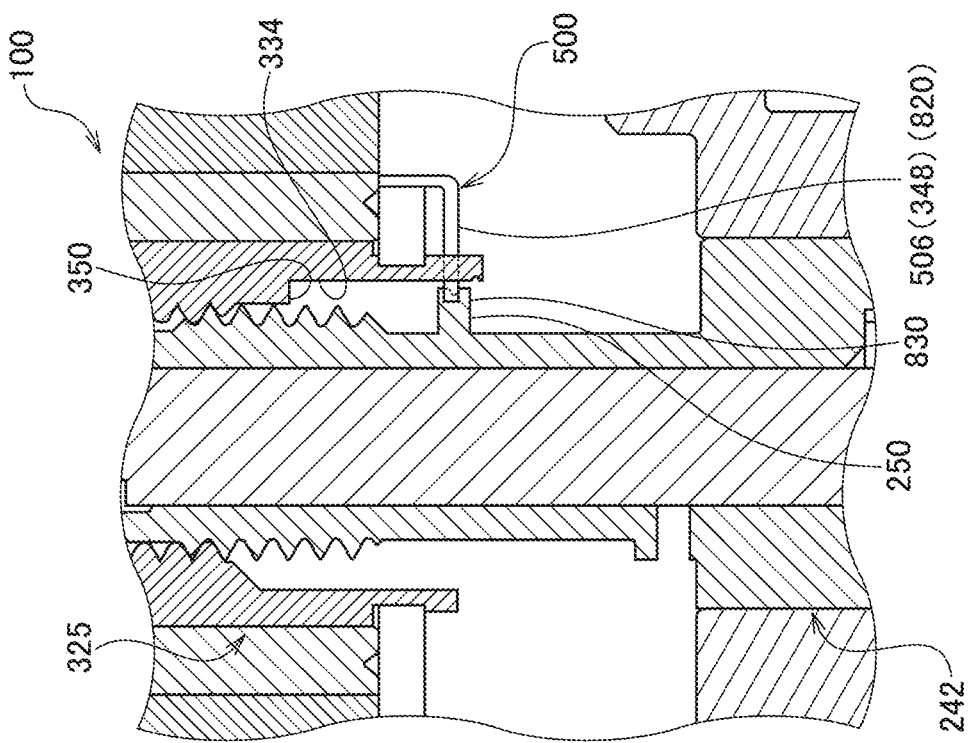
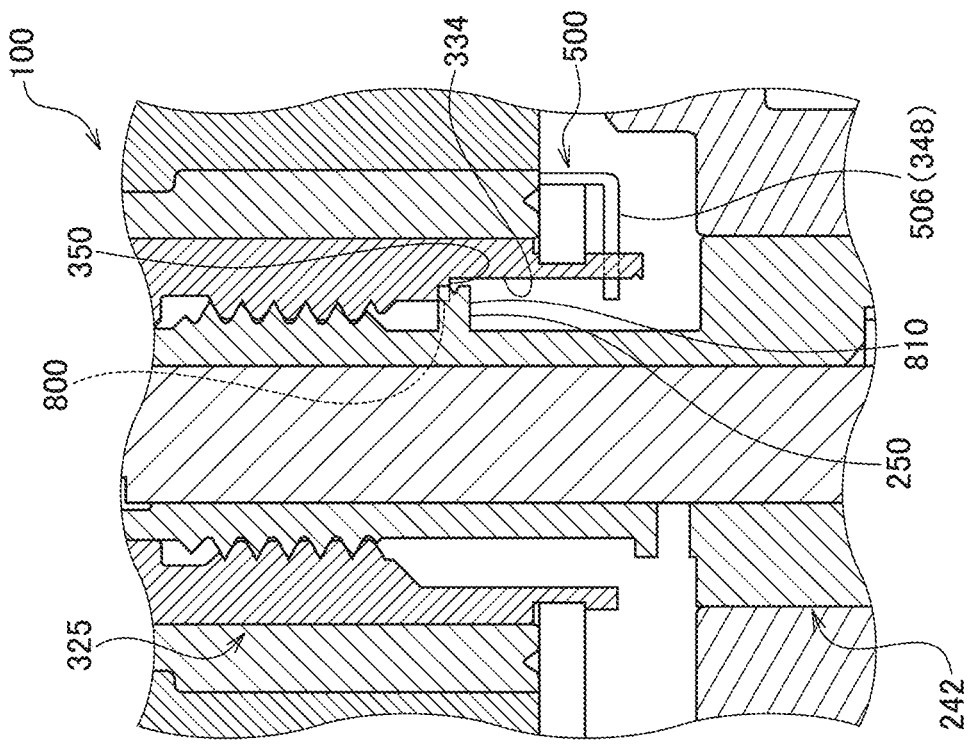

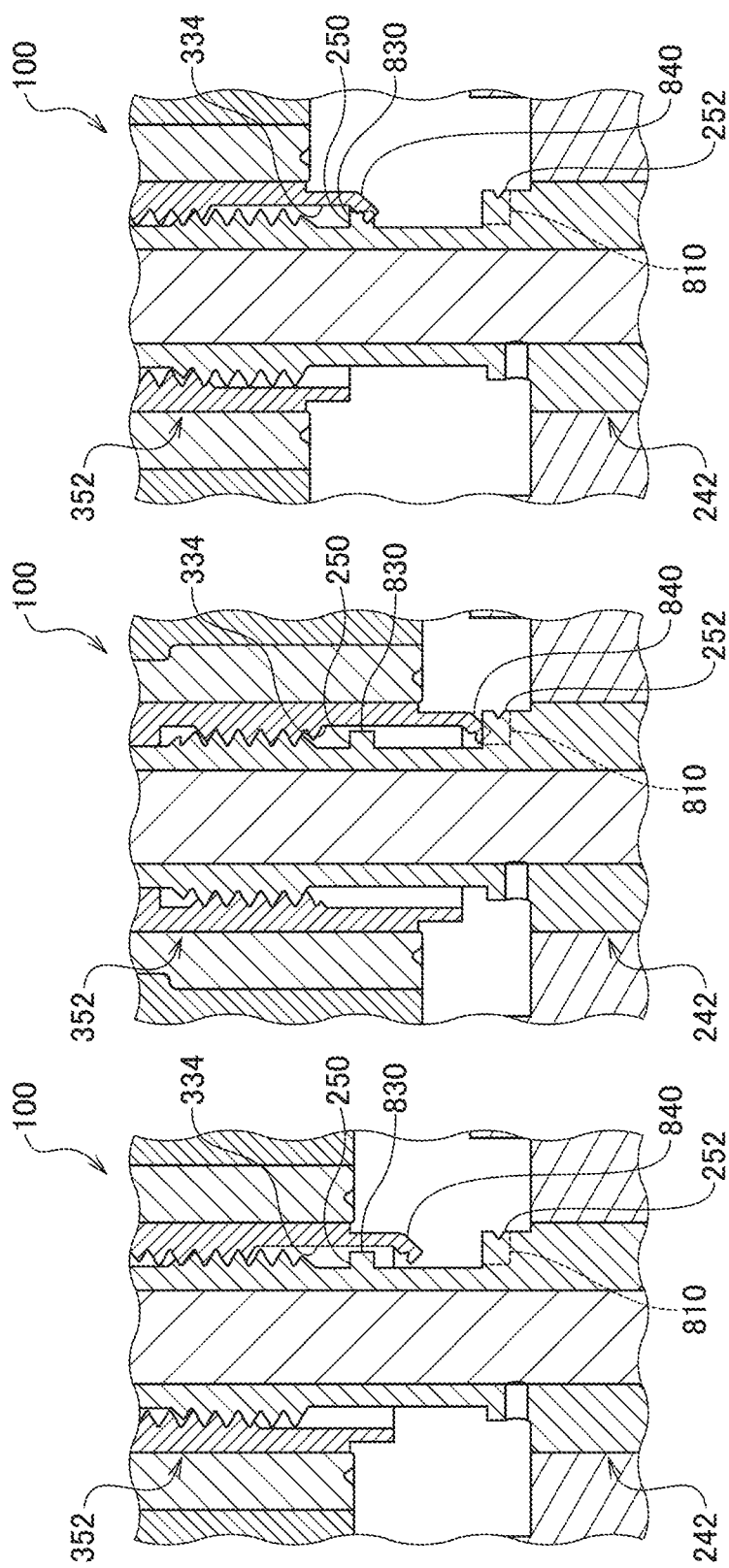

MOTOR OPERATED VALVE

CLAIM OF PRIORITY

This application claims priority to Japanese Patent Application No. 2019-024319 filed on Feb. 14, 2019 and Japanese Patent Application No. 2019-111263 filed on Jun. 14, 2019, which are incorporated herein by reference.

BACKGROUND OF THE INVENTION

1. Field of the Invention

The present invention relates to a motor operated valve and, in particular, to a structure of a stopper mechanism for restricting translational movement of a rotor.

2. Description of the Related Art

An automotive air conditioner typically includes a compressor, a condenser, an expander, an evaporator, and so forth arranged in a refrigeration cycle. For the expander, a motor operated expansion valve that enables accurate control of the valve opening degree by means of a stepping motor as a drive unit has been increasingly used. Such a motor operated expansion valve includes a mechanism for causing a valve element supported by an end of a shaft to touch and leave a valve seat formed on a body. For the movement of touching and leaving the valve seat, a technology of converting rotational movement of a rotor into translational movement of the shaft by employing a feed screw mechanism has been proposed.

The motor operated expansion valve includes a stopper mechanism for restricting the translational movement of the shaft. In related art, a motor operated expansion valve including a stopper member that moves integrally with a rotation shaft of a rotor and a stopper member formed on a body, which achieve a stopper function by being brought into contact with each other in the rotating direction of the rotor, is known (refer to Japanese Patent Application Publication No. H10-047517, for example).

RELATED ART LIST (1) Japanese Patent Application Publication No. H10-047517

Note that high assembling accuracy is required in assembly of a motor operated expansion valve. In a case where a stopper member, which is a member separate from the body, is used for a stopper portion as in Japanese Patent Application Publication No. H10-047517, however, the relative position of the stopper portion has to be considered in the assembly. Such a structure may thus require complicated assembly.

SUMMARY OF THE INVENTION

The present invention has been made in view of the above, and one object thereof is to improve the efficiency of assembly of a motor operated valve.

An embodiment of the present invention is a motor operated valve. The motor operated valve includes: a body including an inflow port through which fluid is introduced from an upstream side, an outflow port through which the fluid is delivered to a downstream side, and a passage through which the inflow port and the outflow port communicate with each other; a valve element to open and close a valve section provided on the passage; a motor including a rotor for driving the valve element in opening and closing directions of the valve section; a feed screw mechanism to convert rotational movement of the rotor into translational movement; and a stopper mechanism to restrict the translational movement of the rotor. The feed screw mechanism includes: a guiding part mounted vertically on the body, and including an external thread portion on an outer surface thereof; and a guided part made of a cylindrical member constituting a rotation shaft of the rotor, including an internal thread portion on an inner surface thereof, and mounted around and thus supported by the guiding part, the internal thread portion being engaged with the external thread portion. The stopper mechanism includes: a stopper portion provided on the guided part; and a stopping face formed integrally with the guiding part. When the valve element is driven by the motor to move in a valve closing direction, the stopping face stops the stopper portion to restrict the movement of the rotor in the valve closing direction.

According to the embodiment, the stopping face constituting the stopper portion is formed integrally with the guiding part, the need for a process of assembling the stopping face and the guiding part is eliminated. This achieves a motor operated valve that is improved in the efficiency of assembly.

BRIEF DESCRIPTION OF THE DRAWINGS

FIGS. 17A to 17E illustrate processes of operation of mounting a rotation shaft and a guiding member;

FIGS. 18A and 18B are cross-sectional views of the vicinity of a stopper member of a motor operated valve according to a fourth embodiment;

FIGS. 19A to 19C are partially-enlarged cross-sectional views of the vicinity of a stopper mechanism of a motor operated valve according to a fifth embodiment.

DETAILED DESCRIPTION

Figure 1:
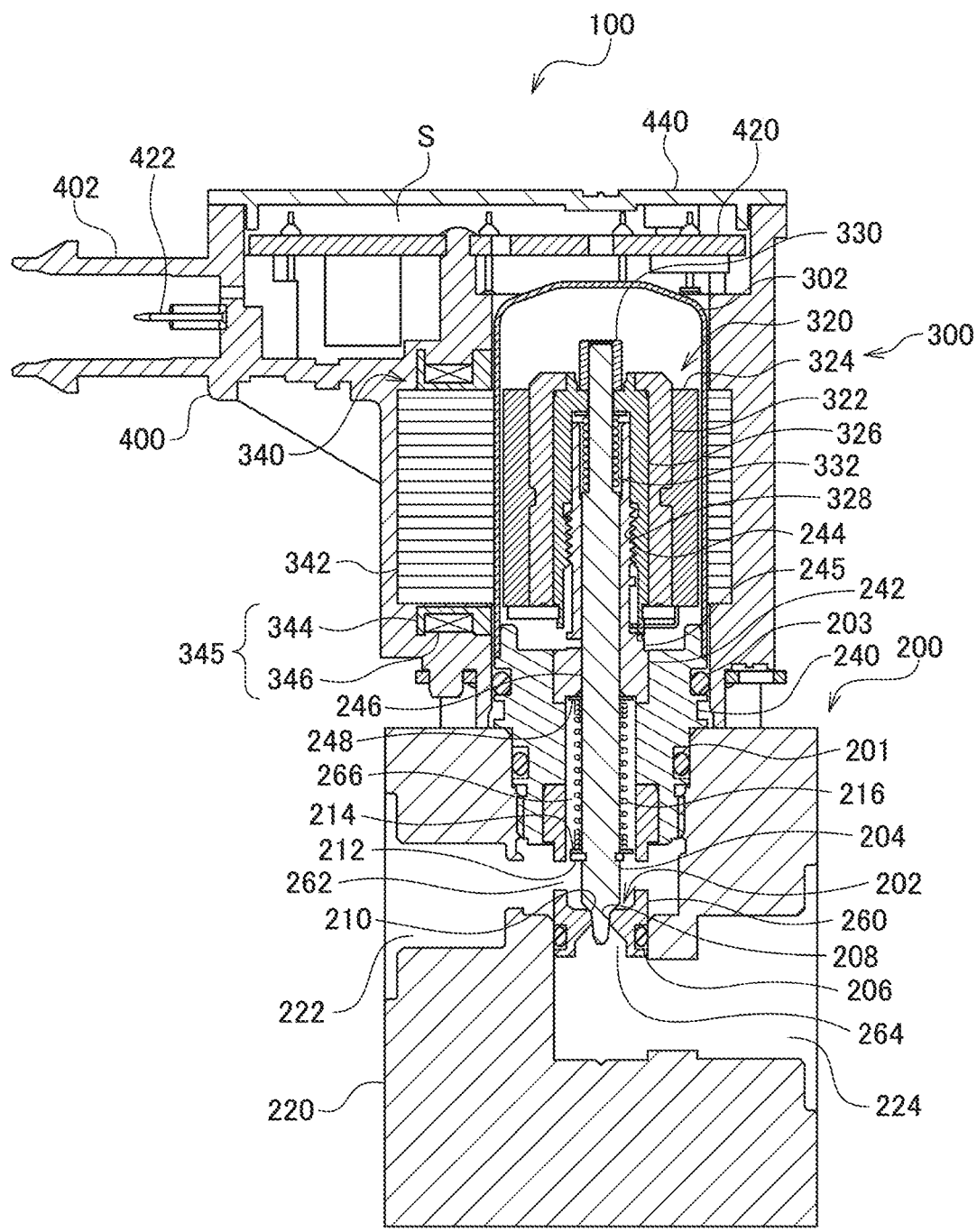
FIG. 1 is a cross-sectional view of a structure of a motor operated valve according to a first embodiment.

Certain embodiments of the invention will now be described. The description is not intended to limit the scope of the present invention, but to exemplify the invention.

The embodiments of the present invention will now be described in detail with reference to the drawings. In the description below, for convenience of description, the positional relationship in each structure may be expressed with reference to how the structure is depicted in the drawings. In the following embodiments and modifications thereof, components that are substantially the same will be designated by the same reference numerals and redundant description thereof may be omitted as appropriate.

First Embodiment

FIG. 1 is a cross-sectional view of a structure of a motor operated valve 100 according to a first embodiment.

The motor operated valve 100 according to the present embodiment is a motor operated expansion valve that functions as an expander, and is constituted by an assembly of a body 200 and a motor unit 300. A valve section 202 is provided inside the body 200.

An inlet port 222 through which high-temperature and high-pressure fluid is introduced from the condenser side and an outlet port 224 through which low-temperature and low-pressure fluid throttled and expanded by the valve section 202 is delivered toward the evaporator are formed at lateral sides of the body 200.

The body 200 includes a first body 220 having a bottomed cylindrical shape, a second body 240 having a cylindrical shape, and a third body 260 having a cylindrical shape. The second body 240 is mounted in an upper part of the first body 220. The third body 260 is mounted in a lower part of the second body 240. The third body 260 is located inside the first body 220. The valve section 202 is accommodated inside the third body 260. A guiding member 242 (guiding part) is mounted vertically at the center of an upper part of the second body 240. The guiding member 242 is a component made of a metal material by cutting, and has an external thread portion 244 formed on the outer surface of a middle portion in the axial direction of the guiding member 242. A lower end portion of the guiding member 242 has a large diameter, and this large-diameter portion 245 is fixed coaxially to the center of an upper part of the second body 240. A shaft 246 extending from a rotor 320 of the motor unit 300 is inserted in the inner side of the second body 240. A lower end portion of the shaft 246 also serves as a valve element 204 of the valve section 202. The guiding member 242 slidably supports the shaft 246 in the axial direction by the inner surface thereof, and rotatably and slidably supports a rotation shaft 326 (guided part) of the rotor 320 by the outer surface thereof.

The inlet port 222 is formed on one lateral side of the first body 220, and the outlet port 224 is formed on another lateral side thereof. Fluid is introduced through the inlet port 222, and delivered out through the outlet port 224. The inlet port 222 and the outlet port 224 communicate with each other via an internal passage formed in the third body 260.

An inflow port 262 is formed at a lateral side of the third body 260, and an outflow port 264 is formed at the bottom thereof. The inflow port 262 communicates with the inlet port 222, and the outflow port 264 communicates with the outlet port 224. The inflow port 262 and the outflow port 264 communicate with each other via a valve chamber 266. A valve hole 208 is formed inside the third body 260, and the upper end opening edge thereof serves as a valve seat 210. The valve element 204 moves toward and away from the valve seat 210 to adjust the opening degree of the valve section 202.

In the valve chamber 266, an E-ring 212 is fitted to a lower portion of the shaft 246. A spring support 214 is provided at an upper position of the E-ring 212. A spring support 248 is also provided under the guiding member 242. A spring 216 that biases the valve element 204 in the closing direction of the valve section 202 is inserted between the two spring supports 214 and 248 coaxially with the valve element 204. In the present embodiment, because the lower end portion of the shaft 246 serves as the valve element 204, the spring 216 also biases the shaft 246 in the valve closing direction.

Next, a structure of the motor unit 300 will be described.

The motor unit 300 is a three-phase stepping motor including the rotor 320 and a stator 340. The motor unit 300 includes a can 302 having a bottomed cylindrical shape. The rotor 320 is located inside the can 302, and the stator 340 is located outside of the can 302.

The stator 340 includes a laminated core 342 and a bobbin 344. The laminated core 342 is constituted by disc-shaped cores stacked in the axial direction. A coil 346 is wound around the bobbin 344. The coil 346 and the bobbin 344 around which the coil 346 is wound constitute a "coil unit 345". The coil unit 345 is mounted on the laminated core 342.

The stator 340 is integrated with a case 400 by molding. A cap member 440 is fitted into an upper end opening of the case 400 in such a manner that a projection on a lower face of the cap member 440 is inserted in the upper end opening of the case 400. A printed circuit board 420 is mounted in a space S surrounded by the case 400 and the cap member 440. The coil 346 is connected with the printed circuit board 420. The case 400 includes a terminal cover portion 402 that protects a terminal 422 for supplying power from an external power supply to the printed circuit board 420.

Annular sealing members 206 and 201 are provided between the third body 260 and the first body 220 and between the second body 240 and the first body 220, respectively. This structure prevents leakage of fluid through a clearance between the first body 220 and the third body 260 and a clearance between the second body 240 and the first body 220. In addition, an annular sealing member 203 is provided between the second body 240 and the case 400. This structure prevents entry of external air (such as moisture) through a clearance between the second body 240 and the case 400.

The rotor 320 includes a cylindrical rotor core 322, and a magnet 324 around the outer circumference of the rotor core 322. The rotor core 322 is mounted on the rotation shaft 326. The magnet 324 is magnetized with a plurality of poles in the circumferential direction.

The rotation shaft 326 is made of a metal material by cutting. The rotation shaft 326 is produced by integrally forming the metal material into a bottomed cylindrical shape. The rotation shaft 326 is mounted (outserted) around the guiding member 242 with its open end facing downward. An internal thread portion 328 formed on the inner surface of the rotation shaft 326 engages with the external thread portion 244 of the guiding member 242. A feed screw mechanism constituted by the thread portions converts the rotational movement of the rotor 320 into the translational movement in the axial direction. The engagement of the internal thread portion 328 and the external thread portion 244 of the feed screw mechanism will be referred to as a "screwed portion". Details of the structure around the open end of the rotation shaft 326 will be described later.

An upper portion of the shaft 246 is reduced in diameter, and this diameter-reduced portion extends through the bottom of the rotation shaft 326. An annular stopper 330 is fixed to the leading end of the diameter-reduced portion. A back spring 332 that biases the shaft 246 downward (valve closing direction) is provided between the base end of the diameter-reduced portion and the bottom of the rotation shaft 326. With this structure, while the valve section 202 is being opened, the shaft 246 is moved integrally with the rotor 320 in a state in which the stopper 330 is stopped by the bottom of the rotation shaft 326. In contrast, while the valve section 202 is being closed, the back spring 332 is compressed by reaction force that the valve element 204 receives from the valve seat 210. In this process, elastic reaction force of the back spring 332 presses the valve element 204 against the valve seat 210, which increases the seating performance (valve closing performance) of the valve element 204.

Figure 2:
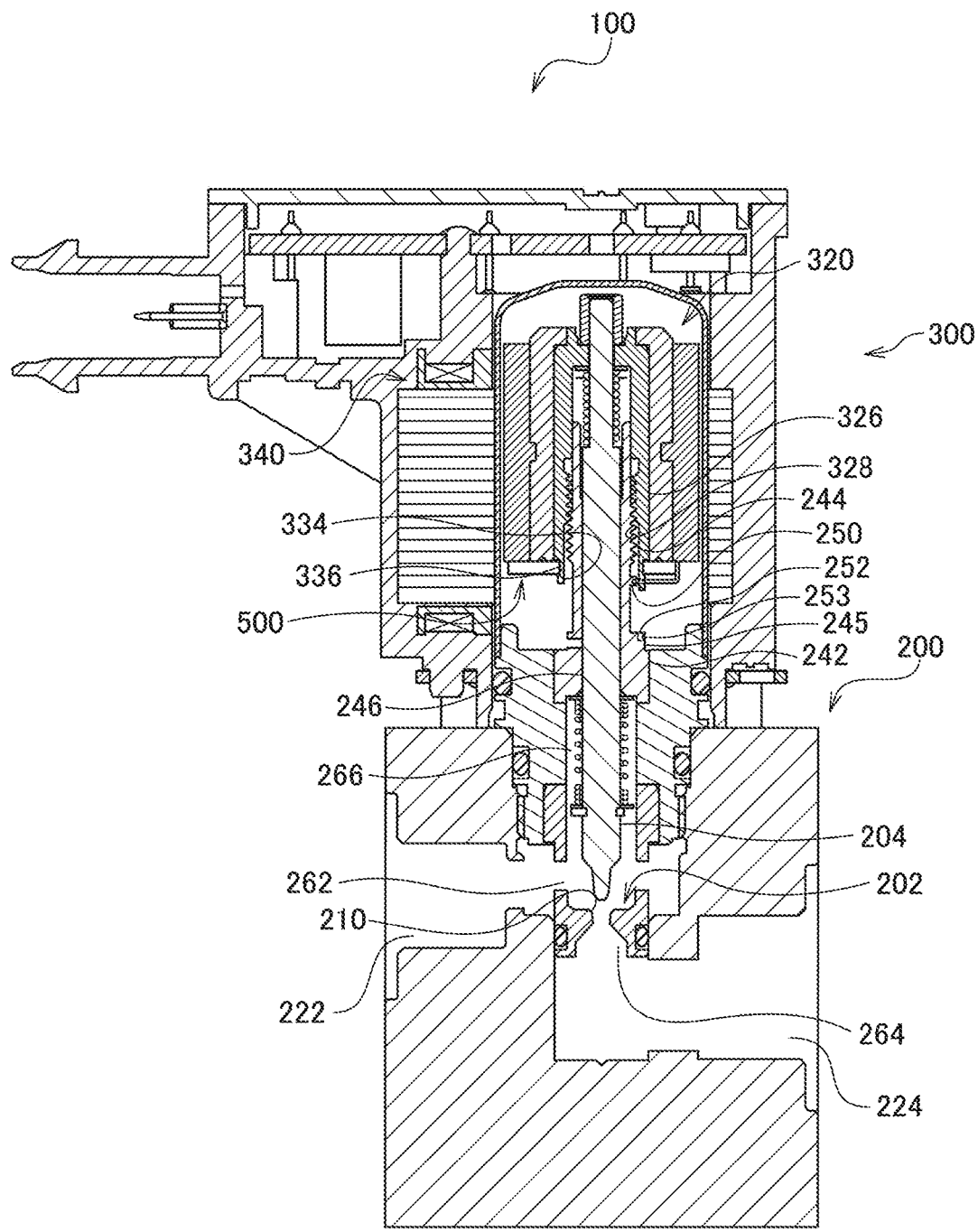
FIG. 2 is a cross-sectional view illustrating an open state of the motor operated valve.

FIG. 2 is a cross-sectional view illustrating a fully open state of the motor operated valve 100.

The motor operated valve 100 includes a stopper mechanism that restricts the translational movement of the rotation shaft 326. The stopper mechanism includes a projection at the open end of the rotation shaft 326, two projections on the outer surface of the guiding member 242, and a stopper member 500.

The rotation shaft 326 has an enlarged-diameter portion 334, which is increased in inner diameter, at a lower part thereof. The enlarged-diameter portion 334 extends from immediately under the internal thread portion 328 to the lower end of the rotation shaft 326. The open end of the rotation shaft 326 protrudes below the rotor 320, and an annular recess 336 is formed along the outer surface of the protruding portion. The stopper member 500 is fitted into the recess 336.

A first projection 250 is formed on the outer surface of the guiding member 242 at a position a little lower than the external thread portion 244. A second projection 252 is formed at a position lower than the first projection 250. The first projection 250 protrudes radially outward from the outer surface of the guiding member 242. The height of the first projection 250 is set to be lower than that of the second projection 252. In the first embodiment, the second projection 252 corresponds to an upper end portion of the large-diameter portion 245. The first projection 250 and the second projection 252 are formed integrally with the guiding member 242. The first projection 250 defines the upper dead center of the translational movement of the rotation shaft 326, and the second projection 252 defines the lower dead center thereof.

When the feed screw mechanism is driven by the motor unit 300 and the rotation shaft 326 starts moving upward, the shaft 246 is moved integrally with the rotor 320. As a result of this movement, the valve element 204 leaves the valve seat 210. Thus, fluid introduced through the inlet port 222, the inflow port 262, and the valve chamber 266 flows out passing through the outflow port 264 and the outlet port 224 in this order.

As illustrated in FIG. 1, in the valve closed state, part of the open end of the rotation shaft 326 is in contact with the upper end portion of the large-diameter portion 245 (the second projection 252 in FIG. 2). In contrast, as illustrated in FIG. 2, in the fully open state, part of the stopper member 500 is in contact with the first projection 250. These two contact states restrict downward (valve closing direction) and upward (valve opening direction) translational movements of the rotation shaft 326. The contact states will be described later in detail.

Next, a structure of the stopper member 500 will be described.

Figure 3A:
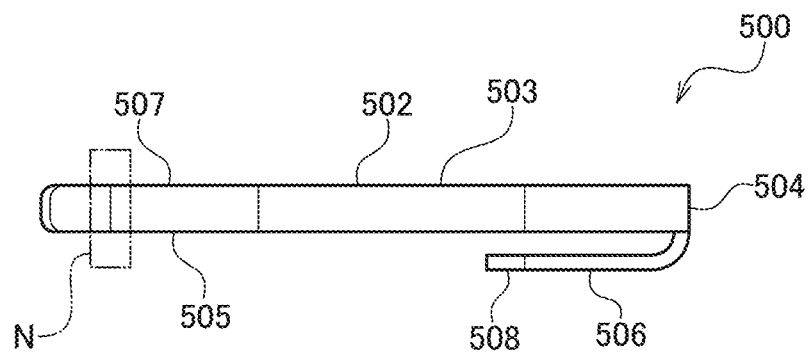
FIGS. 3A to 3C are external views of a stopper member.
Figure 3B:
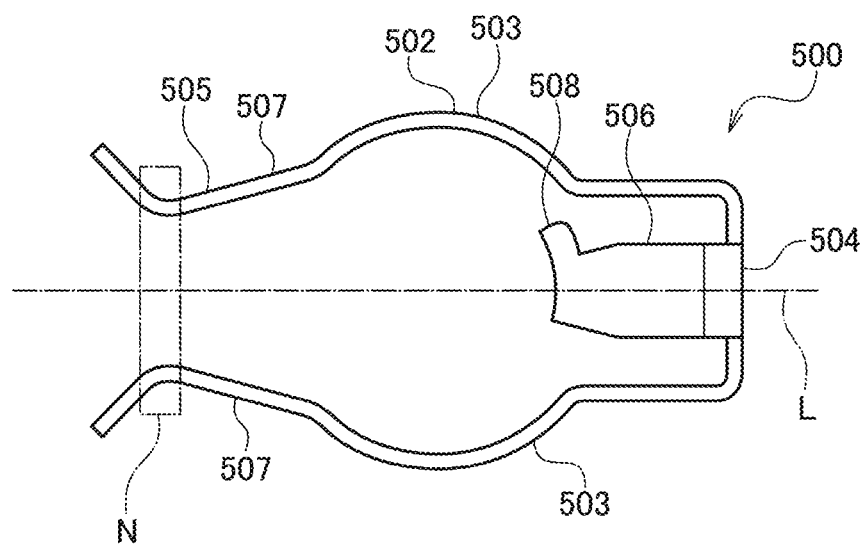
Figure 3C:
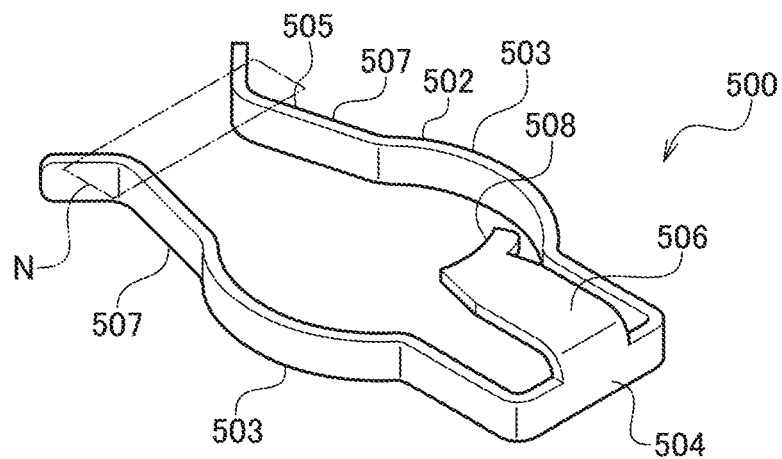

FIGS. 3A to 3C are external views of the stopper member 500. FIG. 3A is a side view, FIG. 3B is a bottom view, and FIG. 3C is a perspective view.

The stopper member 500 is made of a spring material. The stopper member 500 is produced by punching a plate material and bending the resulting belt-like material into a clip-like shape. The stopper member 500 includes arc-shaped fitting portions 502, a connecting portion 504 having a U shape in plan view, and guiding portions 505. The stopper member 500 is such that the fitting portions 502 extend from the respective ends of the connecting portion 504, and the guiding portions 505 extends from the ends of the fitting portions 502 opposite to the sides of the connecting portion 504. The stopper member 500 has a substantially symmetric structure (except for a protrusion 508, which will be described later) with respect to a bisector L of the connecting portion 504.

The fitting portions 502 are constituted by two arc-shaped fitting members 503. The two fitting members 503 are arranged at symmetric positions with respect to the bisector L. The two fitting members 503 have an inscribed circle in common. The curvature of the inscribed circle of the fitting portions 502 (the inscribed circle of the fitting members 503) is equal to that of the bottom of the recess 336. The guiding portions 505 are constituted by two guiding members 507. These guiding members 507 have a shape extending from the points of connection with the fitting members 503 in directions approaching each other, and then extending in directions away from each other. The portions of the guiding portions 505 where the distance between the two guiding members 507 is shortest (the portions where the extending directions changes from the directions approaching each other to the directions away from each other) will be referred to as "narrow portions N".

The stopper member 500 further includes a sticking out portion 506. The sticking out portion 506 has an L shape in side view, sticks out downward from the connecting portion 504 and then extends toward the center axis of the inscribed circle of the fitting portions 502. The extending direction of the sticking out portion 506 is coincident with the extending direction of the bisector L. The sticking out portion 506 has a tapered distal end. In addition, the end face of the distal end of the sticking out portion 506 has a curvature. The sticking out portion 506 includes the protrusion 508 on a side face of the distal end. The protrusion 508 extends from the sticking out portion 506 in the circumferential direction.

Figure 4:
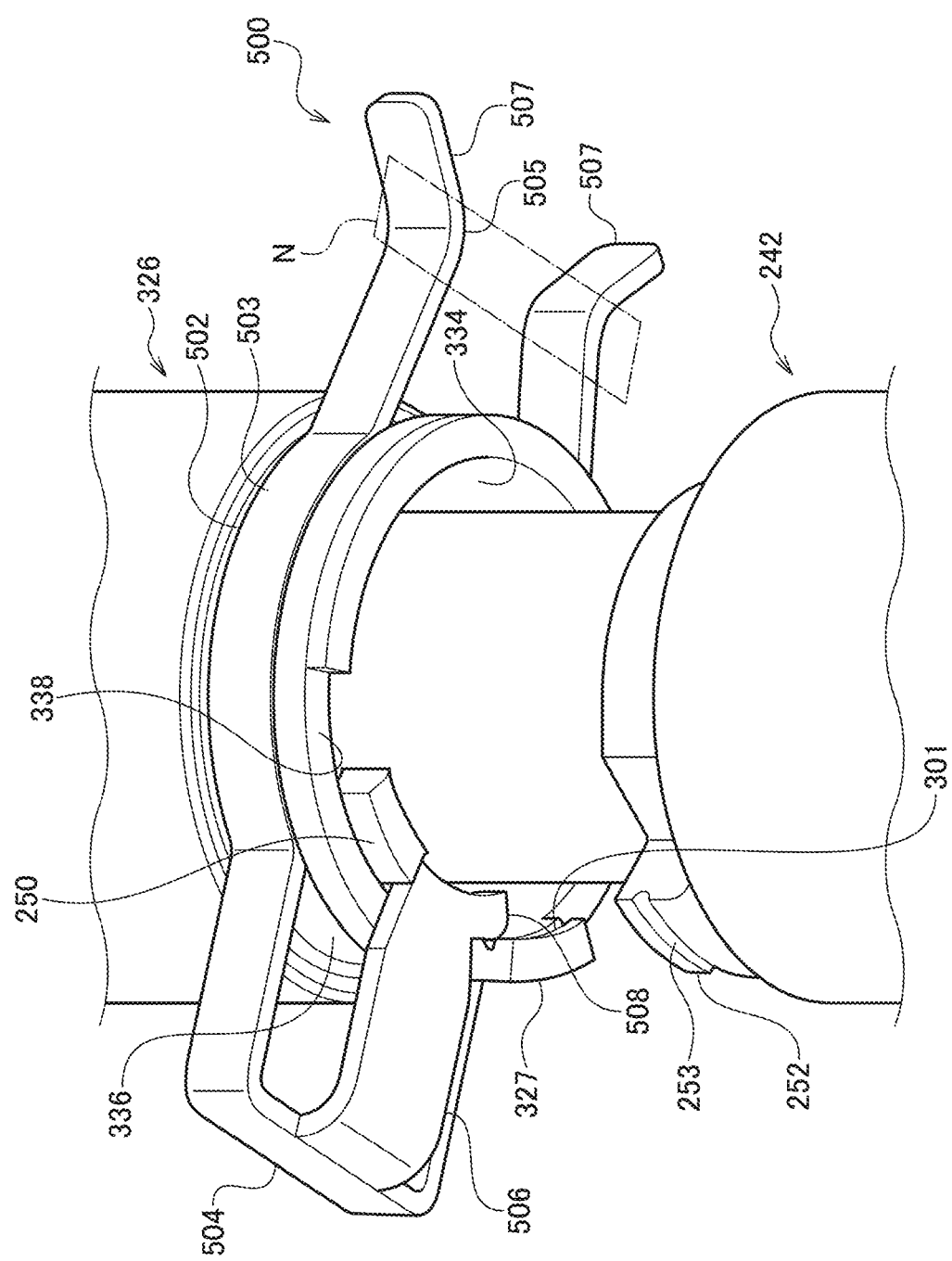
FIG. 4 is a partially enlarged view of the vicinity of the stopper member when the stopper member is mounted on a rotation shaft.

FIG. 4 is a partially enlarged view of the vicinity of the stopper member 500 when the stopper member 500 is mounted on the rotation shaft 326.

The lower end of the rotation shaft 326 has a stepped shape. The stepped shape includes a stepped portion 338 and a projection 327. The stepped portion 338 is recessed from the lower end face of the rotation shaft 326. The stepped portion 338 extends in the rotating direction of the rotation shaft 326 (the circumferential direction of the rotation shaft 326). The sticking out portion 506 is inserted in the stepped portion 338 in the radial direction. The sticking out portion 506 is movable within the range of the stepped portion 338 in the rotating direction. The projection 327 protrudes from the lower end face of the rotation shaft 326. The sticking out portion 506 is positioned between the projection 327 and the first projection 250. Thus, the portion of the projection 327 facing the sticking out portion 506 functions as a "holding portion". In addition, the portion of the projection 327 opposite to the holding portion functions as a "stopping portion" coming into contact with the second projection 252 (derails of which will be described later).

The stopper member 500 is mounted on the rotation shaft 326 in a state in which the sticking out portion 506 is lower than the fitting portions 502. The fitting portions 502 are fitted into the recess 336.

A gap is present between the inner surface of the enlarged-diameter portion 334 and the outer surface of the guiding member 242. The distal end of the sticking out portion 506 is positioned in the gap. Specifically, the sticking out portion 506 sticks out radially inward from the inner surface of the rotation shaft 326. In addition, a clearance is formed between the distal end face of the sticking out portion 506 and the outer surface of the guiding member 242. The stopper member 500 is thus movable around the guiding member 242 in the rotating direction of the rotation shaft 326.

At some point during the translational movement of the rotation shaft 326 (details of which will be described later), the sticking out portion 506 is stopped by the first projection 250 in the rotating direction of the rotation shaft 326. At this point, the projection 327 (functioning as the "holding portion") is in contact with the face of the sticking out portion 506 opposite to the face thereof in contact with the first projection 250. The projection 327 presses the sticking out portion 506 in the rotating direction of the rotation shaft 326 to hold the sticking out portion 506 between the projection 327 and the first projection 250.

The protrusion 508 is inserted between the inner surface of the projection 327 and the outer surface of the guiding member 242. In other words, the protrusion 508 is sandwiched in the radial direction between the inner surface of the projection 327 and the outer surface of the guiding member 242. This structure enables the protrusion 508 to come in contact with the inner surface of the projection 327 and stay on the inner side of the projection 327 even when the stopper member 500 has received a radially outward force. This prevents the stopper member 500 from falling off the rotation shaft 326. The protrusion 508 can also be referred to as a "catching portion" for preventing the stopper member 500 from falling off the rotation shaft 326.

A method of assembling the rotation shaft 326, the guiding member 242, and the stopper member 500 will now be explained with reference to FIG. 4.

First, the leading end of the guiding member 242 is inserted into the rotation shaft 326. The external thread portion 244 and the internal thread portion 328 are engaged with each other (see FIG. 1), so that the guiding member 242 is inserted into the rotation shaft 326. A gap is present between the first projection 250 and the enlarged-diameter portion 334. The presence of the gap allows the first projection 250 to be inserted into the enlarged-diameter portion 334. After the first projection 250 is inserted to a position upper than the stepped portion 338, the stopper member 500 is made to fit to the rotation shaft 326 in the radial direction. In this process, the ends of the guiding portions 505 are first applied to the bottom of the recess 336, and the guiding portions 505 and the fitting portions 502 are then fitted along the recess 336. The narrow portions N of the guiding portions 505 are widened along the bottom of the recess 336 and pass over the bottom. When the narrow portions N have passed over the bottom of the recess 336, the widened narrow portions N are restored by the spring force. When the fitting portions 502 are fitted to the positions where the bottom of the recess 336 and the fitting portions 502 are concentric, the fitting of the fitting portions 502 into the recess 336 is completed. The sticking out portion 506 is inserted into the stepped portion 338. The protrusion 508 is inserted between the projection 327 and the guiding member 242, and the sticking out portion 506 is held between the projection 327 and the first projection 250. In this manner, the assembly of the rotation shaft 326, the guiding member 242, and the stopper member 500 is completed.

For assembling the rotation shaft 326 and the guiding member 242, the first projection 250 needs to be inserted into the rotation shaft 326. Thus, the inner diameter of the rotation shaft 326 (the inner diameter of the enlarged-diameter portion 334) is set to be larger than the diameter of the circumscribed circle of the first projection 250 with the center at the axis of the guiding member 242. In addition, for restricting the upward (valve opening direction) translational movement of the rotation shaft 326 by using the first projection 250, the first projection 250 and the rotation shaft 326 need to come in contact with each other at some portion. In the present embodiment, after the rotation shaft 326 and the guiding member 242 are assembled and the first projection 250 is inserted into the rotation shaft 326, the stopper member 500 that functions as a stopper is mounted. The stopper sticks out radially inward relative to the inner diameter of the rotation shaft 326. This structure enables smooth assembly of the rotation shaft 326 and the guiding member 242. In addition, the stopper mechanism functions during valve opening operation. This improves the efficiency of assembly of the motor operated valve 100 including the stopper mechanism.

In mounting the stopper member 500, the guiding portions 505 enable the fitting portions 502 to be smoothly fit into the recess 336. In addition, the tapered shape of the distal end of the sticking out portion 506 enables the sticking out portion 506 to be smoothly inserted into the stepped portion 338. Note that a notch 253 extends on the outer surface of the second projection 252 in the circumferential direction. The notch 253 extends like a root of a thread along a virtual spiral about the axis of the guiding member 242. In addition, a notch 301 extends on the inner surface of the projection 327 in the circumferential direction. The notch 301 extends like a root of a thread along a virtual spiral about the axis of the rotation shaft 326. Details of the notch 253 and the notch 301 will be described later.

Figure 5A:
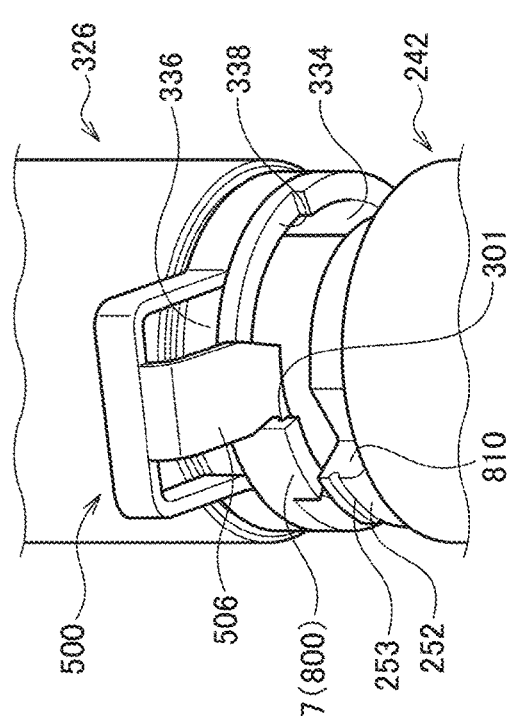
FIGS. 5A to 5D illustrate operation processes of the motor operated valve in transition from a closed state to a fully open state.
Figure 5B:
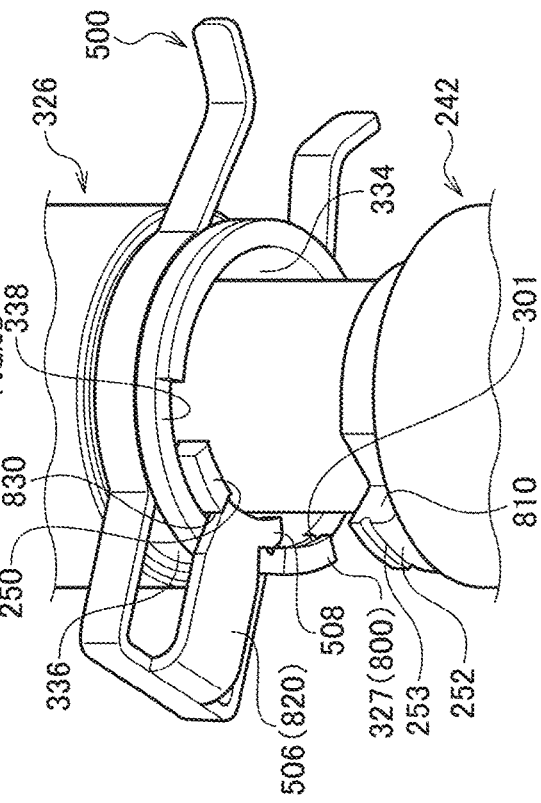
Figure 5C:
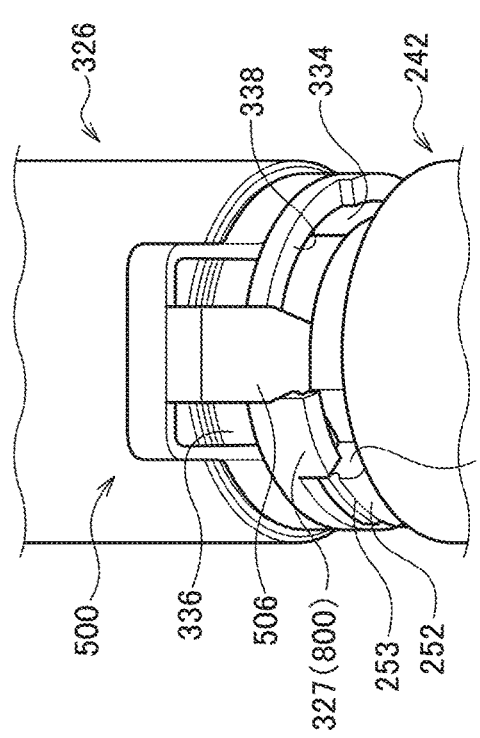
Figure 5D:
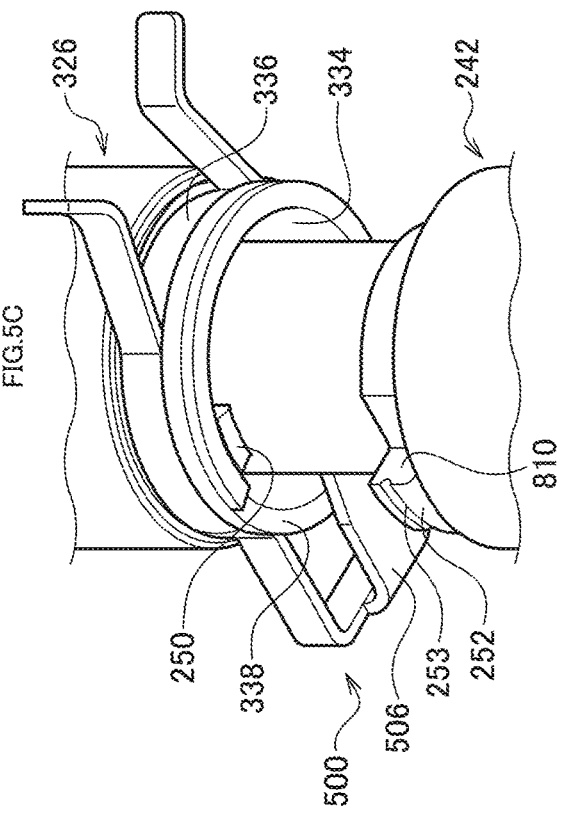

FIGS. 5A to 5D illustrate operation processes of the motor operated valve 100 in transition from the closed state to the fully open state. FIG. 5A illustrates the valve closed state, FIG. 5B illustrates a state slightly open from the closed state, FIG. 5C is a state slightly closed from the fully open state, and FIG. 5D illustrates the fully open state.

Figure 6A:
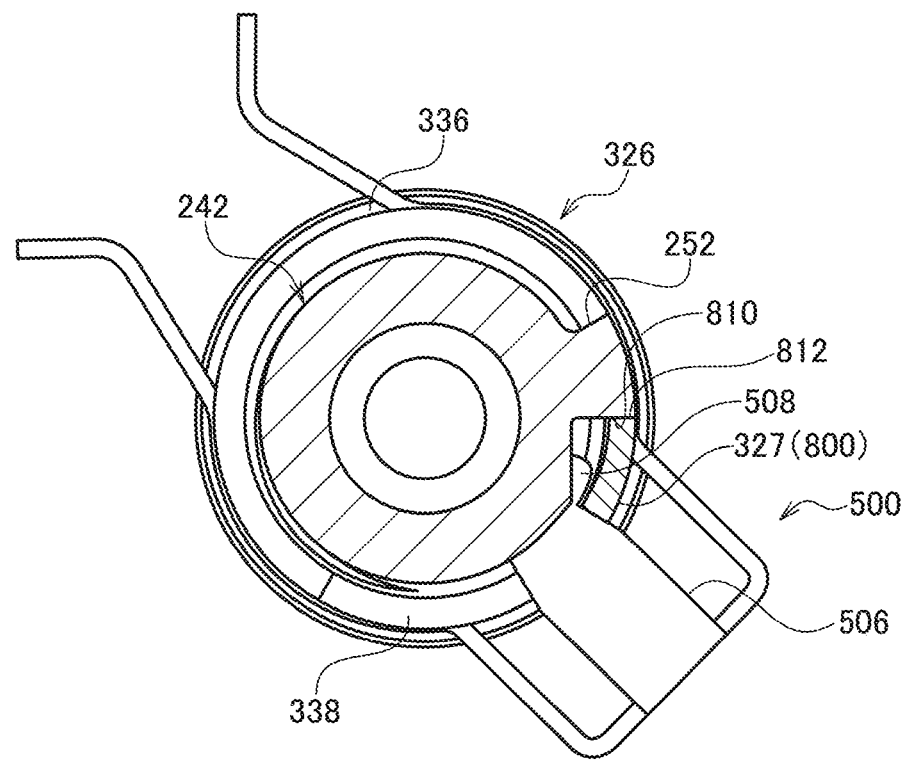
FIGS. 6A and 6B are transverse sectional views illustrating the vicinity of the stopper member in a state in which a stopper mechanism functions.
Figure 6B:
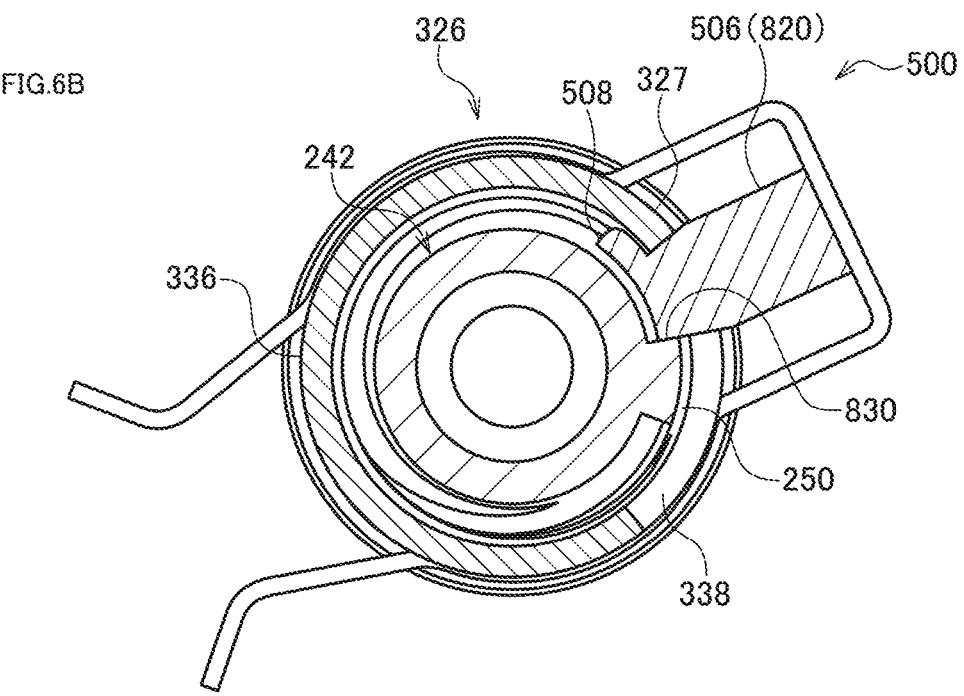

FIGS. 6A and 6B are transverse sectional views illustrating the vicinity of the stopper member 500 in a state in which the stopper mechanism functions as viewed from below. FIG. 6A illustrates the valve closed state, and FIG. 6B illustrates the fully open state.

Operation around the stopper member 500 will be explained.

When the valve section 202 is in the closed state, the relative positions of the rotation shaft 326, the guiding member 242, and the stopper member 500 are as illustrated in FIGS. 5A and 6A. Specifically, the second projection 252 and the projection 327 (functioning as a "stopping portion") are in contact with each other in the rotating direction of the rotation shaft 326, so that the downward movement of the rotation shaft 326 is restricted. In the process in which the valve section 202 (see FIG. 1) is opened (FIGS. 5B and 5C), the second projection 252 and the projection 327 are separated from each other, and the movement of the rotation shaft 326 in the axial direction is permitted. When the valve section 202 becomes fully open (FIGS. 5D and 6B), the first projection 250 and the sticking out portion 506 come into contact with each other, and the upward movement of the rotation shaft 326 is restricted. The projection 327 and the sticking out portion 506 move integrally during the translational movement of the rotation shaft 326 from the valve closed state to the fully open state of the valve section 202.

As illustrated in FIGS. 5D and 6B, the sticking out portion 506 is referred to as a "first stopper portion 820", and the face of the first projection 250 coming in contact with the sticking out portion 506 is referred to as a "first stopping face 830". A stopper mechanism including the first stopper portion 820 and the first stopping face 830 and restricting the upward movement of the rotation shaft 326 is referred to as a "first stopper mechanism". When the first stopping face 830 stops the first stopper portion 820, the movement of the rotation shaft 326 in the valve opening direction is restricted. In addition, as illustrated in FIGS. 5A and 6A, the projection 327 is referred to as a "second stopper portion 800", and the face of the second projection 252 coming in contact with the projection 327 is referred to as a "second stopping face 810". A stopper mechanism including the second stopper portion 800 and the second stopping face 810 and restricting the downward movement of the rotation shaft 326 is referred to as a "second stopper mechanism". When the second stopping face 810 stops the second stopper portion 800, the movement of the rotation shaft 326 in the valve closing direction is restricted. In addition, as illustrated in FIG. 6A, the face of second stopper portion 800 coming in contact with the second stopping face 810 is referred to as a "contact face 812".

With reference back to FIG. 1, a pressure receiving structure of the motor operated valve 100 will be described.

In the motor operated valve 100, fluid introduced through the inlet port 222 is delivered into the can 302 via the inflow port 262 and the valve chamber 266. The fluid introduced inside the can 302 applies a downward pressure (the pressure of fluid upstream of the valve section 202) to the upper end portion of the shaft 246. In the meantime, fluid introduced in the outlet port 224 and the outflow port 264 applies an upward pressure (the pressure of fluid downstream of the valve section 202) to the lower end portion of the shaft 246 (the valve element 204). When the valve section 202 is closed, the pressure of the fluid upstream of the valve section 202 is higher than that of the downstream fluid. Thus, in the valve closed state, the shaft 246 (the valve element 204) receives a force caused by pressure difference between the upstream fluid pressure and the downstream fluid pressure in the valve closing direction. The force biasing the shaft 246 in the valve closing direction becomes maximum in the valve closed state, that is, when the second stopping face 810 stops the second stopper portion 800 (FIGS. 5A and 6A).

When the valve section 202 is opened from the closed state, a force acting against the force caused by the pressure difference and biasing the shaft 246 in the valve closing direction is needed. As described in relation to FIG. 1, the translational movement of the shaft 246 (the valve element 204) is obtained by conversion of the rotational movement of the rotor 320 moving integrally therewith. Thus, the thrust in the axial direction of the valve element 204 is larger as the torque applied to the rotor 320 is larger. The torque is proportional to an area in which the rotor 320 and the stator 340 face each other (an area in which the rotor 320 and the stator 340 overlap each other). In the present embodiment, the rotor 320 and the stator 340 are set so that the rotor 320 and the stator 340 are at the same height and the area in which the rotor 320 and the stator 340 face each other is thus maximum when the valve section 202 is closed, that is, when the second stopping face 810 stops the second stopper portion 800. This structure increases the thrust for lifting the valve element 204 upward.

Structures of the guiding member 242 and the rotation shaft 326 will now be described.

Figure 7A:
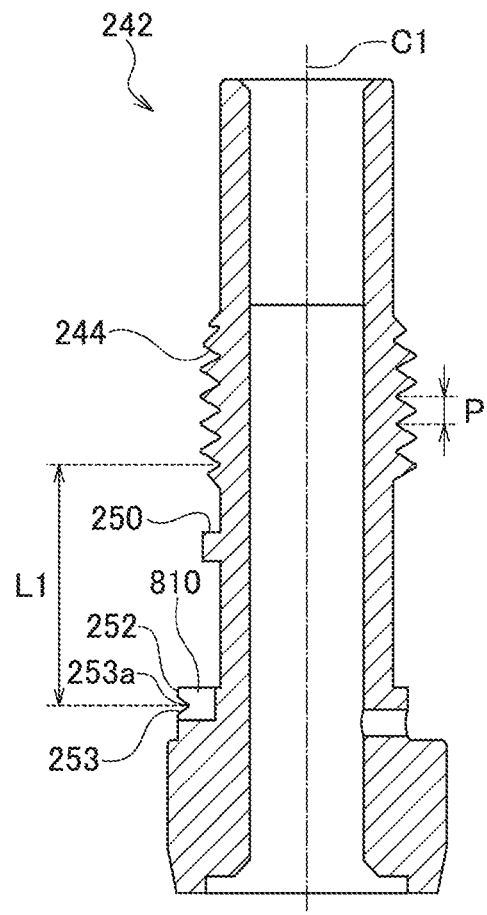
FIGS. 7A to 7C illustrate structures of a guiding member and the rotation shaft.
Figure 7B:
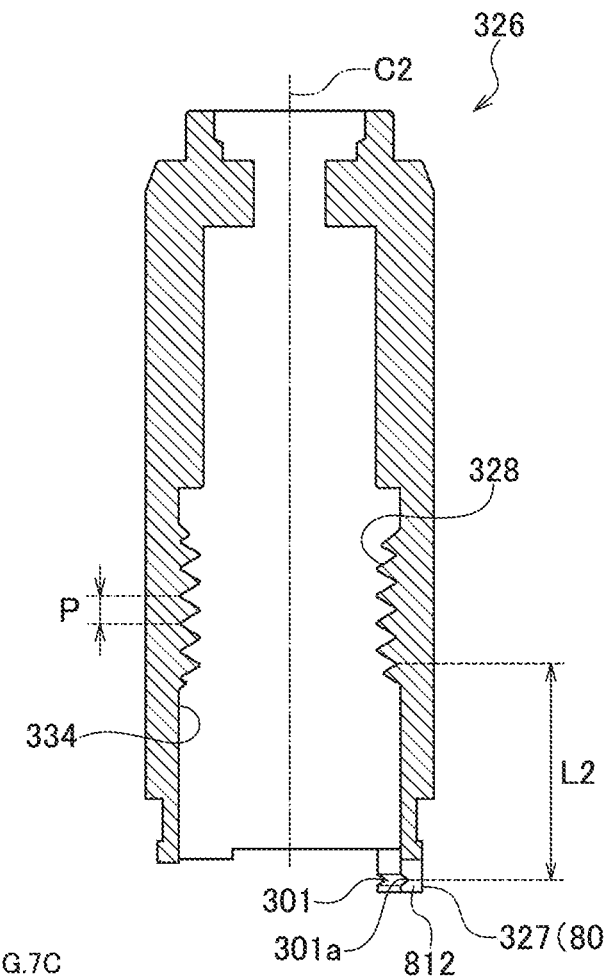
Figure 7C:
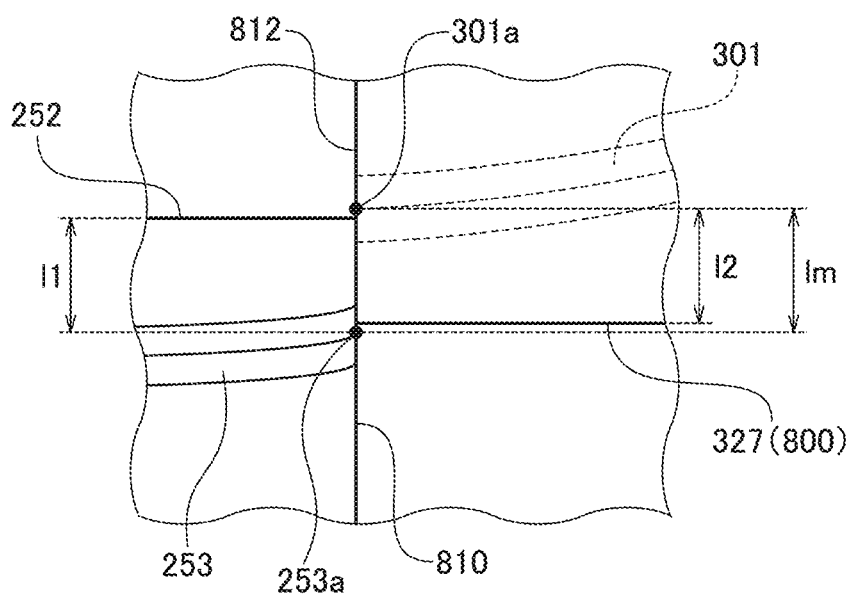

FIGS. 7A to 7C illustrate the structures of the guiding member 242 and the rotation shaft 326. FIG. 7A is a cross-sectional view including the second stopping face 810 of the guiding member 242, FIG. 7B is a cross-sectional view including the contact face 812 of the rotation shaft 326, and FIG. 7C is a conceptual diagram illustrating a state of contact of second projection 252 and the second stopper portion 800.

As described in relation to FIG. 4, the notch 253 in a spiral shape similar to the external thread portion 244 is formed on the outer surface of the second projection 252. In addition, the notch 301 in a spiral shape similar to the internal thread portion 328 is formed on the inner surface of the projection 327.

The distance between adjacent roots of each of the external thread portion 244 in FIG. 7A and the internal thread portion 328 in FIG. 7B is referred to a "pitch P". The cross-section illustrated in FIG. 7A is present on a plane including an intersection 253a of the deepest line of the notch 253 and the second stopping face 810, and the axis C1 of the guiding member 242. In a part of the plane including the intersection 253a with respect to the axis C1 (the left part of the cross-sectional view of FIG. 7A), the distance L1 in the axial direction between the notch 253 and the root of the external thread portion 244 is set to a (a is an integer) times the pitch P. The cross-section illustrated in FIG. 7B is present on a plane including an intersection 301a of the deepest line of the notch 301 and the contact face 812, and the axis C2 of the rotation shaft 326. In a part of the plane including the intersection 301a with respect to the axis C2 (the right part of the cross-sectional view of FIG. 7B), the distance L2 in the axial direction between the notch 301 and the root of the internal thread portion 328 is also set to be b (b is an integer) times the pitch P. Note that a and b may either be the same number or different numbers. The technical significance of the distance L1 and the distance L2 will be described later with the explanation of FIG. 7C.

Formation of the external thread portion 244 of the guiding member 242 and the internal thread portion 328 of the rotation shaft 326 will be described. As described in relation to FIG. 1, the guiding member 242 is produced by cutting a columnar metal material (hereinafter referred to as a "columnar member"). In cutting of the guiding member 242, the first projection 250 and the second projection 252 are formed on the outer surface of the columnar member. The external thread portion 244 is formed by moving a working tool in a direction approaching the second projection 252 from a machining start position of the external thread portion 244 while the columnar member is rotated about its axis. After the formation of the external thread portion 244, the rotation of the columnar member and the movement of the working tool are maintained, and the notch 253 is formed on the outer surface of the columnar member by using the working tool. As a result, the distance L1 is an integer multiple of the pitch P.

The rotation shaft 326 is produced by cutting a cylindrical metal material (hereinafter referred to as a "cylindrical member"). Before cutting of the internal thread portion 328, the notch 301 is formed on the inner surface of the cylindrical member while rotating the cylindrical member about its axis. The notch 301 is formed by moving a working tool used for forming the internal thread portion 328 in the axial direction. The rotation of the cylindrical member and the movement of the working tool are maintained, and the internal thread portion 328 is formed by moving the working tool in the direction away from the notch 301. As a result, the distance L2 is an integer multiple of the pitch P.

In the present embodiment, the second stopping face 810 and the external thread portion 244 are formed integrally with the guiding member 242. In addition, the second stopper portion 800 and the internal thread portion 328 are formed integrally with the rotation shaft 326. For the second stopping face 810 to stop the second stopper portion 800, phase management of the second stopping face 810 and the external thread portion 244, and phase management of the contact face 812 and the internal thread portion 328 need to be strictly performed, as will be described later.

Figure 8A:
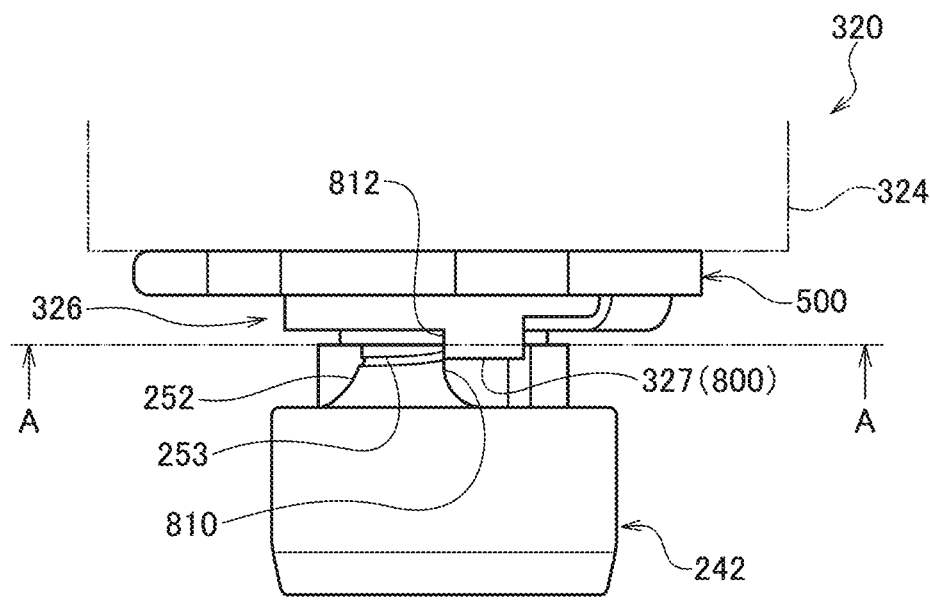
FIGS. 8A and 8B illustrate a state in which a second stopper portion is stopped by a second stopping face (when the valve is closed)
Figure 8B:
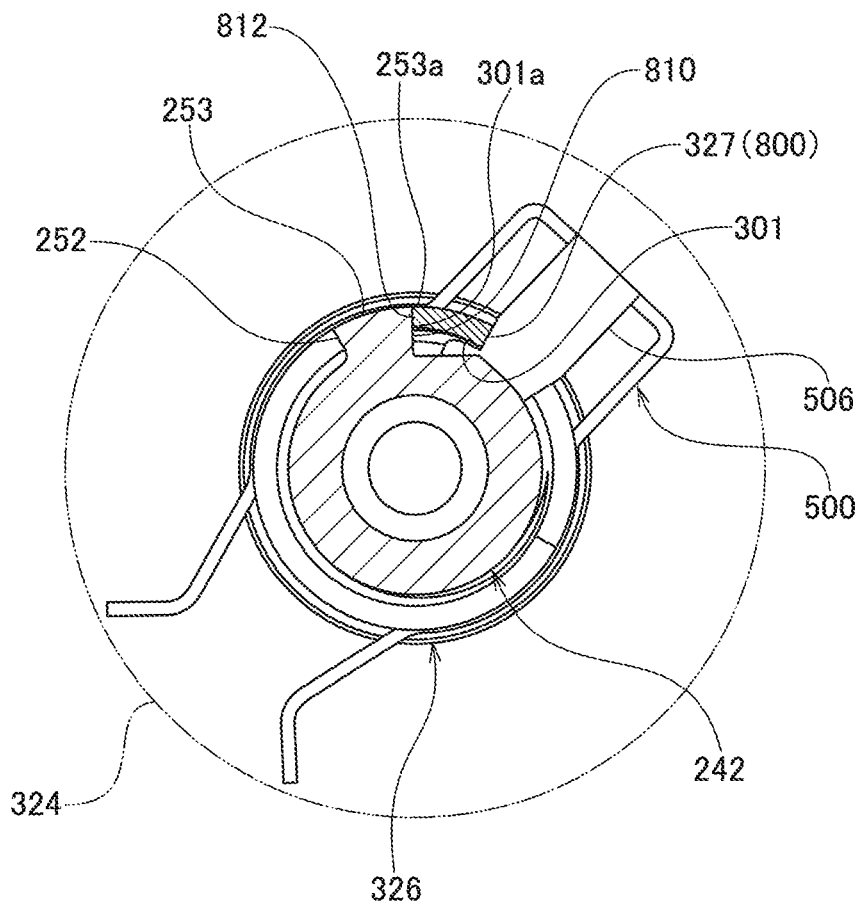

FIGS. 8A and 8B illustrate a state in which the second stopper portion 800 is stopped by the second stopping face 810 (when the valve is closed). FIG. 8A is a front view of the vicinity of the notch 253, and FIG. 8B is a cross-sectional view along a line shown by arrows A-A in FIG. 8A.

Figure 9A:
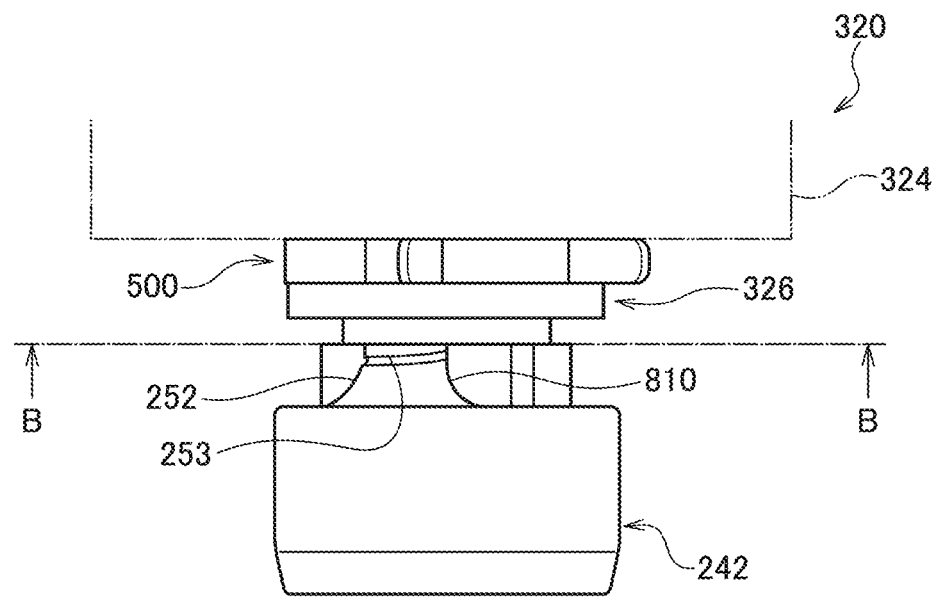
FIGS. 9A and 9B illustrate a state in which the second stopper portion has turned 150 degrees from the valve closed state.
Figure 9B:
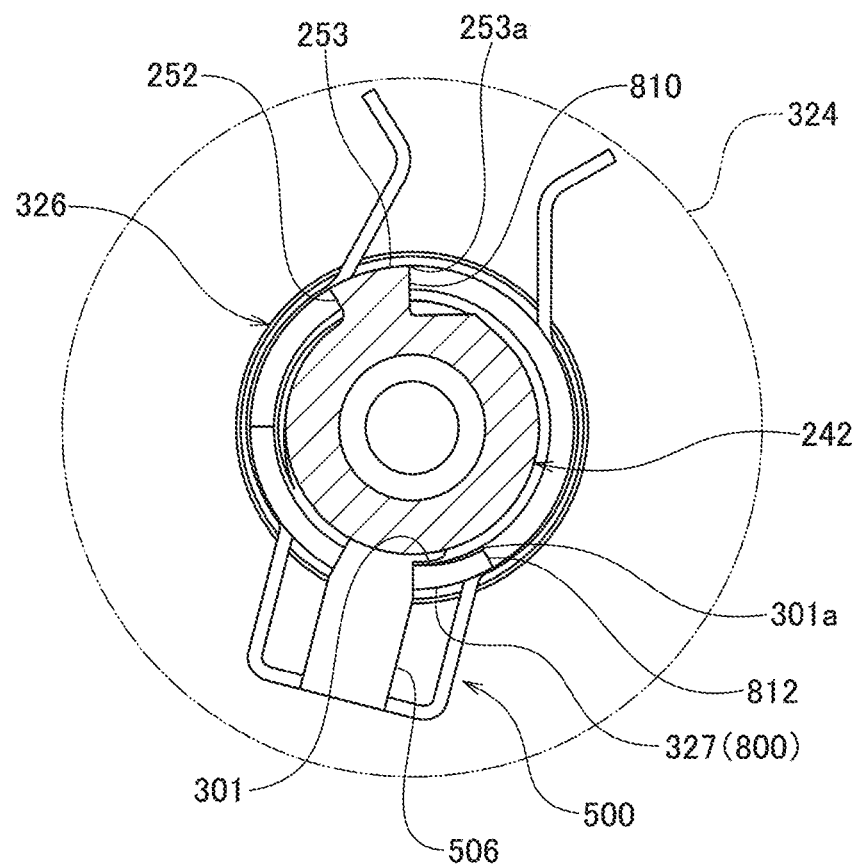

FIGS. 9A and 9B illustrate a state in which the rotation shaft 326 has turned 150 degrees from the state illustrated in FIGS. 8A and 8B. FIG. 9A is a front view of the vicinity of the notch 253, and FIG. 9B is a cross-sectional view along a line shown by arrows B-B in FIG. 9A.

Figure 10A:
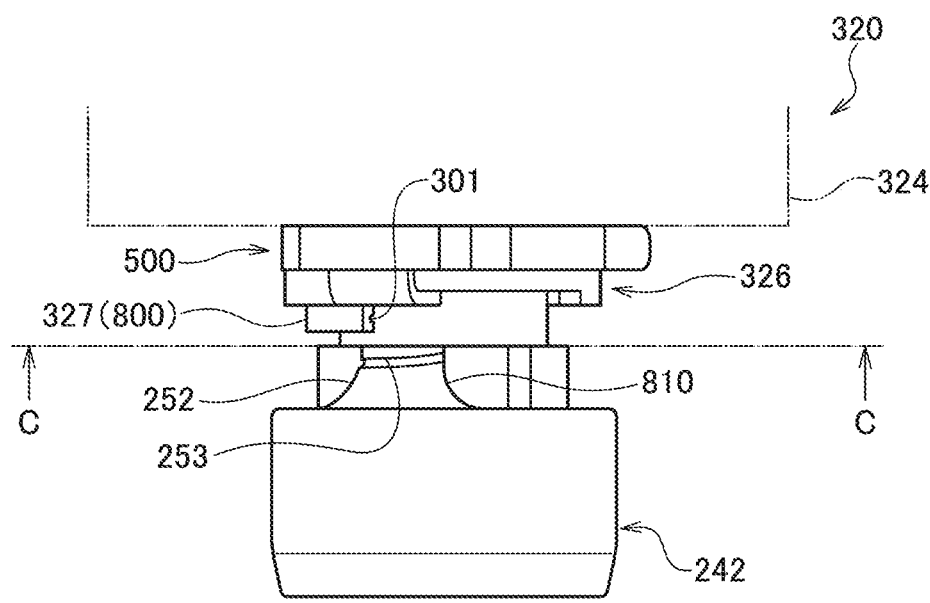
FIGS. 10A and 10B illustrate a state in which the second stopper portion has turned 300 degrees from the valve closed state.
Figure 10B:
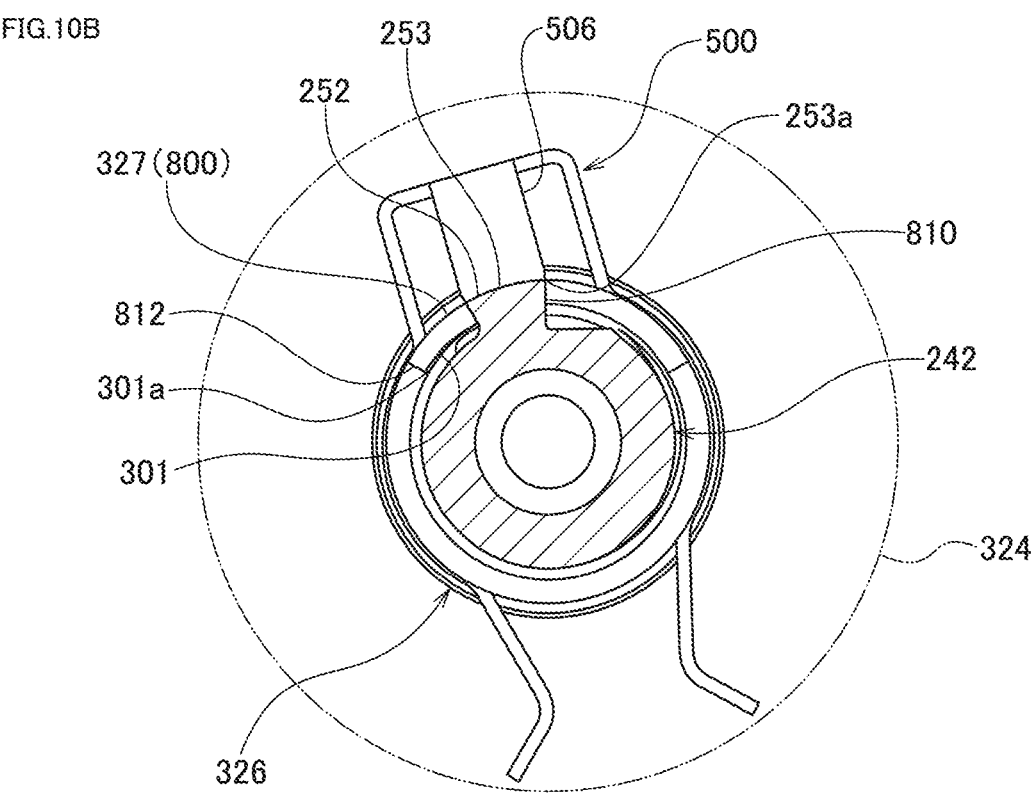

FIGS. 10A and 10B illustrate a state in which the rotation shaft 326 has turned 300 degrees from the state illustrated in FIGS. 8A and 8B. FIG. 10A is a front view of the vicinity of the notch 253, and FIG. 10B is a cross-sectional view along a line shown by arrows C-C in FIG. 10A.

When the rotation shaft 326 turns in a direction corresponding to valve opening operation from the valve closed state, the second stopper portion 800 reaches the second projection 252 at some angle. In order to prevent the rotation of the rotation shaft 326 from being blocked by the second stopper portion 800 hitting the second projection 252, the lower end face of the second stopper portion 800 has to be located above the upper end face of the second projection 252 at this angle. Thus, the length of contact between the contact face 812 and the second stopping face 810 in the axial direction is set to be shorter than a translation distance (pitch P) of the second stopper portion 800 while the rotation shaft 326 makes one turn. This enables the second stopper portion 800 to smoothly move without hitting the second projection 252 during the valve opening operation. In addition, in order that the second stopper portion 800 is stably stopped by the second stopping face 810 in the valve closed state, the area of contact thereof needs to be as large as possible. Thus, the length of the contact in the axial direction is set to be as close to the pitch P as possible. This enables the second stopping face 810 to appropriately stop the second stopper portion 800.

As illustrated in FIGS. 8A to 10B, the second projection 252 and the second stopper portion 800 each actually extend along a virtual arc about the axis. Specifically, the second projection 252 and the second stopper portion 800 each extend on a virtual arc having a center angle of 30 degrees. Thus, the length of contact between the contact face 812 and the second stopping face 810 in the axial direction is set to be shorter than the translation distance of the second stopper portion 800 while the second stopper portion 800 turns 300 degrees and also as long as possible. This enables the second stopper portion 800 to avoid interference from the second projection 252 during the valve opening operation, and enables the second stopping face 810 to appropriately stop the second stopper portion 800.

The relation between the length of contact between the contact face 812 and the second stopping face 810 in the axial direction and the pitch P is determined by the relative positions of the second stopping face 810 and the external thread portion 244 (phases based on the rotation) and the relative positions of the contact face 812 and the internal thread portion 328 (phases based on the rotation). These phases will be explained next.

The distance L1 and the distance L2 will be explained with reference back to FIGS. 7A to 7C.

FIG. 7C illustrates a state of contact between the second projection 252 and the second stopper portion 800. In FIG. 7C, various lengths of the second projection 252 and the second stopper portion 800 are shown. l1 represents the distance in the axial direction between the upper end face of the second projection 252 and the intersection 253a. l2 represents the distance in the axial direction between the lower end face of the second stopper portion 800 and the intersection 301a. lm represents the distance in the axial direction between the intersection 253a and the intersection 301a when the valve is closed.

As described in relation to FIGS. 8A to 10B, the length l1+l2−lm of the contact between the contact face 812 and the second stopping face 810 in the axial direction is set to be shorter than the pitch P. This setting is based on a case where both of the center angles of the virtual arcs along which the second stopper portion 800 and the second projection 252 extend are 0 degrees. In fact, as illustrated in FIGS. 8A to 10B, the second stopper portion 800 and the second projection 252 each have a length in the rotating direction of the rotation shaft 326. With reference back to FIG. 7C, when a total of the center angles of the virtual arcs along which the second stopper portion 800 and the second projection 252 extend is x degrees, a condition for the second stopper portion 800 to smoothly rotate during the valve opening operation is: l1+l2−lm<(1−x/360)P (formula 1).

As described in relation to FIGS. 7A and 7B, the distance L1 and the distance L2 are set to a times the pitch P and b times the pitch P, respectively. In other words, both of the distance L1 and the distance L2 are set to integer multiples of the pitch P. When the external thread portion 244 and the internal thread portion 328 engage with each other, the crest of the external thread portion 244 faces the root of the internal thread portion 328. Thus, the distance lm illustrated in FIG. 7C is ½P. In addition, the center angle x is determined when the second stopper portion 800 and the second projection 252 are designed. Thus, the remaining variables in the formula 1 are the distance l1 and the distance l2.

Because the distance L1 and the distance L2 are both set to be integer multiples of the pitch P, the distance lm is determined. Thus, only the distance l1 and the distance l2 need to be set to satisfy the formula 1. Because the distance l1 and the distance l2 are determined on the basis of the center angle x, phase management is also needed accordingly. Because the distance L1 and the distance L2 are both integer multiples of the pitch P, simpler design of the second stopper portion 800 and the second projection 252 for achieving appropriate valve opening operation is achieved.

As described above, according to the first embodiment, the second projection 252 (the second stopping face 810) is formed integrally with the guiding member 242. This structure eliminates the need for assembling the second stopping face 810 and the guiding member 242, which improves the efficiency of assembly of the motor operated valve 100.

According to the first embodiment, the distance L1 and the distance L2 are both integer multiples of the pitch P. This setting enables appropriate contact between the contact face 812 and the second stopping face 810, and achieves simpler design of the second stopper portion 800 and the second projection 252 for smoothly rotating the second stopper portion 800.

According to the first embodiment, the stopper member 500 is mounted after the rotation shaft 326 and the guiding member 242 are assembled. The inner diameter of the enlarged-diameter portion 334 is larger than the diameter of the circumscribed circle of the first projection 250 with the center at the axis of the guiding member 242. In addition, the enlarged-diameter portion 334 extends to the lower end of the rotation shaft 326. As a result, the rotation shaft 326 can be smoothly mounted around the guiding member 242. In addition, the sticking out portion 506 sticks out radially inward from the inner surface of the rotation shaft 326. This enables the first projection 250 and the sticking out portion 506 to come into contact with each other in the rotating direction of the rotation shaft 326 during the valve opening operation. Thus, the translational movement in the valve opening direction of the rotation shaft 326 can be restricted during the valve opening operation.

According to the first embodiment, the first projection 250 is located inside the rotation shaft 326 in the valve closed stated. In addition, in transition from the valve closed state to the fully open state, the first projection 250 relatively moves in the inside of the rotation shaft 326 to approach the lower end (the open end) of the rotation shaft 326. In the fully open state, the position of the first projection 250 is a position at which the first projection 250 stops the sticking out portion 506. In other words, at least part of the first stopping face 830 is contained inside the enlarged-diameter portion 334 depending on the position of the rotor 320 in the translation direction (the driving state of the rotor 320). Because the first stopping face 830 is present under the rotation shaft 326 of the rotor 320, the total length of the rotor 320, the first stopper mechanism, and the second stopper mechanism in the axial direction can be made shorter. Thus, the length of the motor operated valve 100 in the axial direction can be made shorter.

According to the first embodiment, the first stopping face 830 and the second stopping face 810 are located between the screwed portion and the valve section 202. In addition, the screwed portion of the feed screw mechanism and the rotor 320 are located at the same height in the axial direction. Thus, the distance between the center of gravity and the support point of the rotor 320 can be made shorter, and whirling of the rotor 320 due to the rotation of the rotor 320 is suppressed.

Figure 11A:
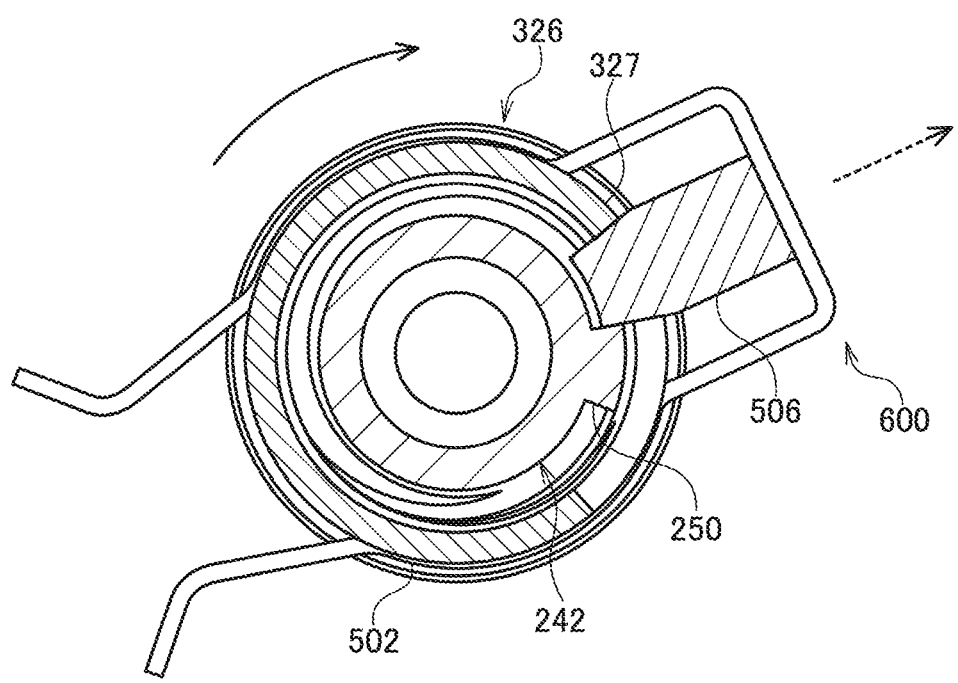
FIGS. 11A and 11B are cross-sectional views of the vicinity of a stopper member according to a comparative example in a case where the stopper member is used in the motor operated valve.
Figure 11B:
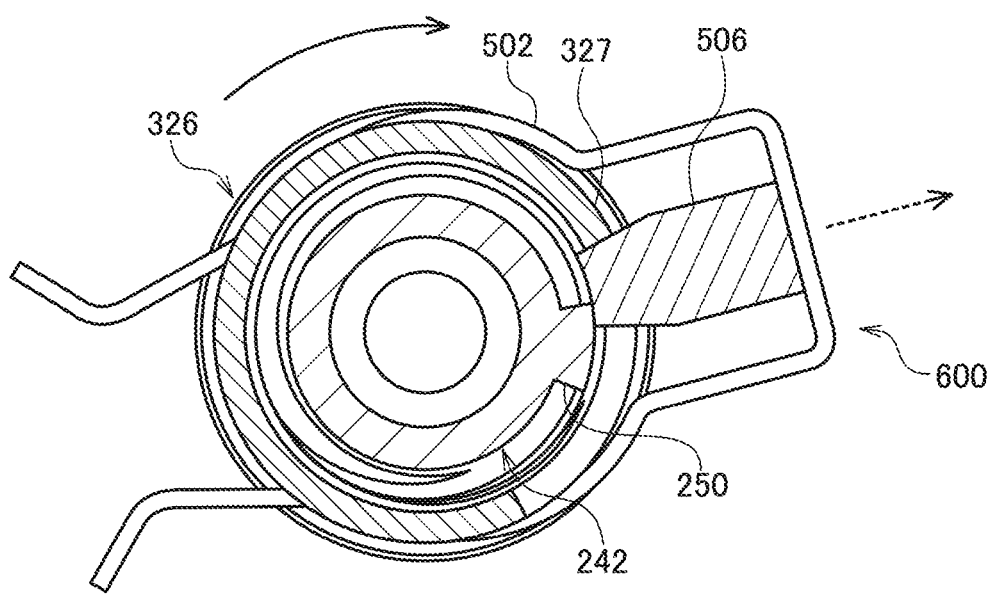

FIGS. 11A and 11B are cross-sectional views of the vicinity of a stopper member 600 according to a comparative example as viewed from below in a case where the stopper member 600 is used in the motor operated valve 100. FIG. 11A illustrates a state in which the stopper member 600 is properly fitted to the rotation shaft 326. FIG. 11B illustrates a state in which the stopper member 600 is about to fall off the rotation shaft 326.

In FIGS. 11A and 11B, a solid arrow indicates the rotating direction of the rotation shaft 326 during the valve opening operation. A broken line arrow indicates the moving direction of the stopper member 600.

The stopper member 600 does not include a part corresponding to the protrusion 508 (see FIGS. 3A to 3C) of the stopper member 500 at the distal end portion of the sticking out portion 506. In the fully open state, the sticking out portion 506 is stopped by the first projection 250 in the rotating direction of the rotation shaft 326. The projection 327 is in contact with the sticking out portion 506 in a state in which the sticking out portion 506 is sandwiched between the projection 327 and the first projection 250. Even after the fully open state is reached, the rotation shaft 326 continues to turn in the rotating direction of the valve opening operation (the direction indicated by the solid arrow in FIGS. 11A and 11B) by the driving of the motor unit 300. The force of this turning of the rotation shaft 326 acts as a force of the projection 327 pressing the sticking out portion 506 against the first projection 250. The distal end portion of the sticking out portion 506 has a tapered shape. Thus, a force pressing the sticking out portion 506 radially outward (in the direction indicated by the broken line arrow in FIGS. 11A and 11B) is applied by the pressing force from the projection 327 and the reaction force from the first projection 250. This pressing force causes the stopper member 600 to fall off the rotation shaft 326. In a case where the spring force of the stopper member 600 is large, however, the fitting portions 502 can stay in the recess 336. In the case where the spring force of the stopper member 600 is large, the catching portion may not be provided like the stopper member 600.

Second Embodiment

A second embodiment is different from the first embodiment in the shape of a stopper member 700. The following description will focus on the difference from the first embodiment.

Figure 12A:
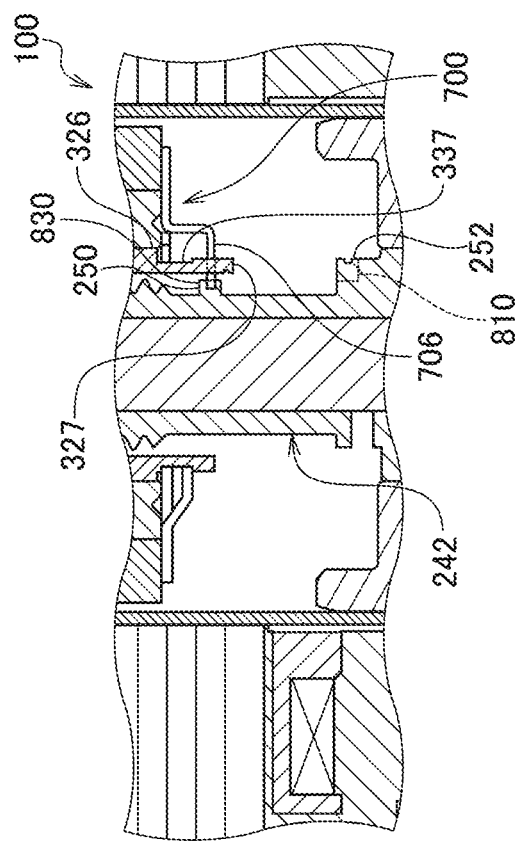
FIGS. 12A and 12B are cross-sectional views of a motor operated valve in a case where a stopper member according to a second embodiment is used in the motor operated valve.
Figure 12B:
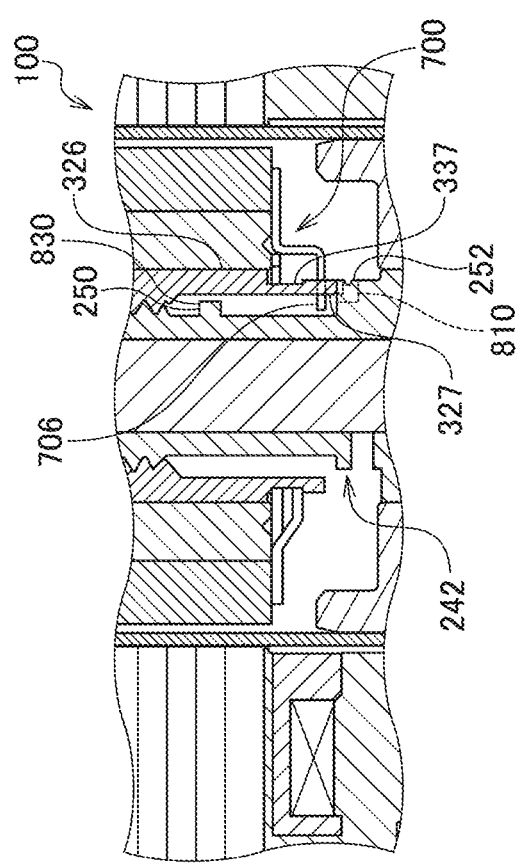

FIGS. 12A and 12B are cross-sectional views of the motor operated valve 100 in a case where the stopper member 700 according to the second embodiment is used in the motor operated valve 100. FIG. 12A illustrates a valve closed state, and FIG. 12B illustrates a fully open state.

A recess 337 is formed on the outer surface of the open end of the rotation shaft 326. The stopper member 700 is fitted into the recess 337, to be fitted to the open end of the rotation shaft 326. Details of the structure of the stopper member 700 will be described later.

In the valve closed state, the projection 327 is stopped by the second projection 252 in the rotating direction of the rotation shaft 326. This structure restricts the movement of the rotation shaft 326 in the valve closing direction (downward). In the fully open state, a sticking out portion 706 (which will be described later) of the stopper member 700 and the first projection 250 are in contact with each other in the rotating direction of the rotation shaft 326. This structure restricts the movement of the rotation shaft 326 in the valve opening direction (upward).

Figure 13A:
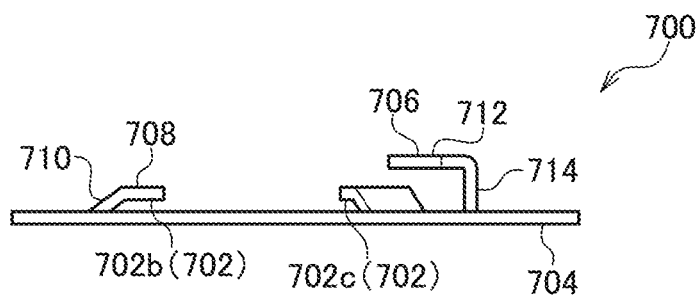
FIGS. 13A to 13C are external views of the stopper member.
Figure 13B:
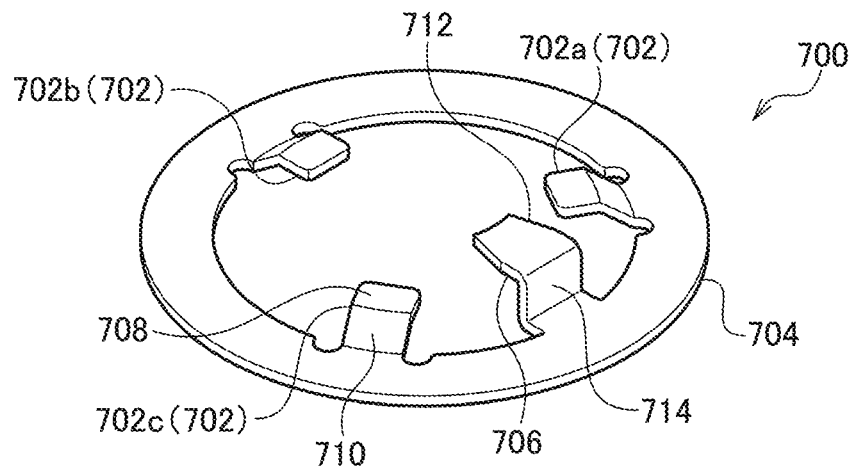
Figure 13C:
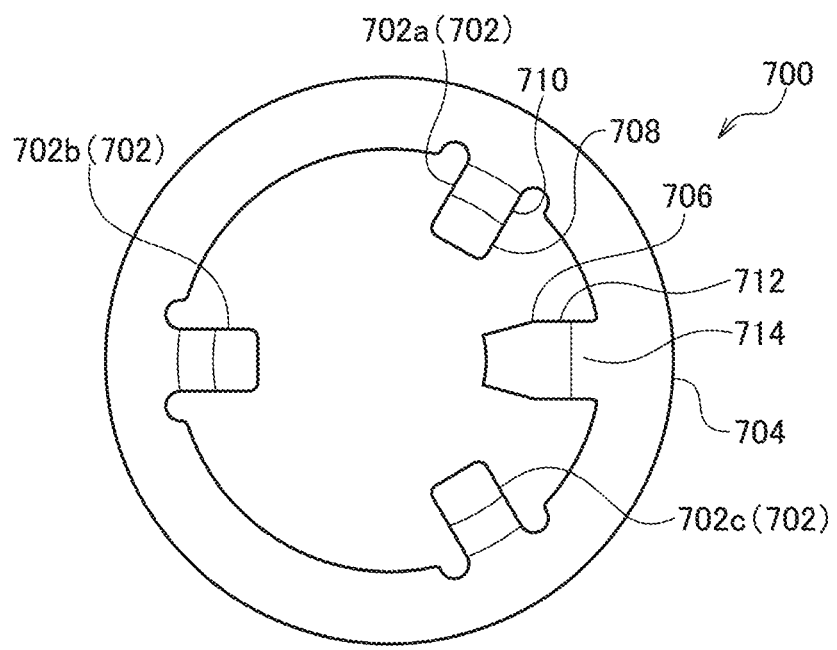

FIGS. 13A to 13C are external views of the stopper member 700. FIG. 13A is a side view, FIG. 13B is a perspective view, and FIG. 13C is a plan view.

The stopper member 700 includes fitting portions 702a, 702b, and 702c (collectively referred to as "fitting portions 702") having a rectangular plate shape, a connecting portion 704 having a disc plate shape, and the sticking out portion 706 having a rectangular plate shape. The fitting portions 702 each have a plate-like fitting end portion 708, and a plate-like bridge portion 710. The fitting end portions 708 are arranged in parallel with the connecting portion 704. The bridge portions 710 bridge between the fitting end portions 708 and the inner surface of the connecting portion 704 to connect the fitting end portions 708 with the connecting portion 704. The fitting portions 702 extend from the inner surface of the connecting portion 704 in the directions toward the center of the inscribed circle of the connecting portion 704. Three fitting portions 702 are arranged in the circumferential direction at intervals of 120 degrees. The connecting portion 704 connects the fitting portions 702 with the sticking out portion 706. The sticking out portion 706 includes a plate-like stopper portion 712 and a plate-like bridge portion 714. The stopper portion 712 is arranged in parallel with the connecting portion 704. The bridge portion 714 bridges between the stopper portion 712 and the inner surface of the connecting portion 704. The height of the stopper portion 712 with respect to the connecting portion 704 is higher than that of the fitting end portion 708 with respect to the connecting portion 704. The sticking out portion 706 extends from the inner surface of the connecting portion 704 in a direction toward the center of the inscribed circle of the connecting portion 704. The sticking out portion 706 is positioned at 180 degrees from the fitting portion 702b.

Figure 14A:
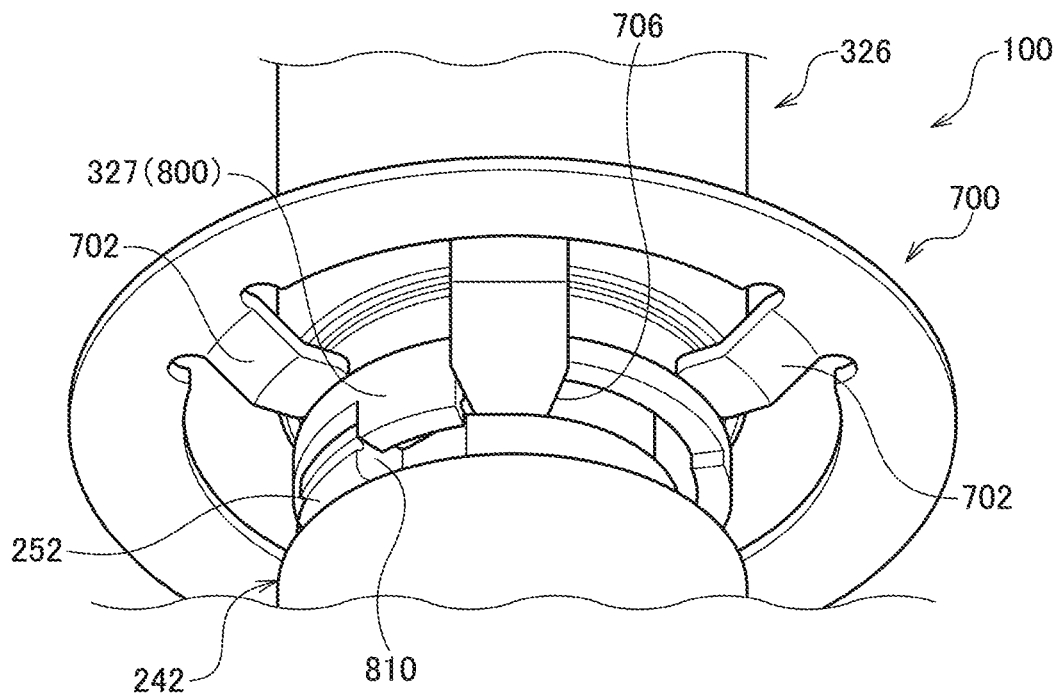
FIGS. 14A and 14B are perspective views of the vicinity of the stopper member in a case where the stopper member is used in the motor operated valve.
Figure 14B:
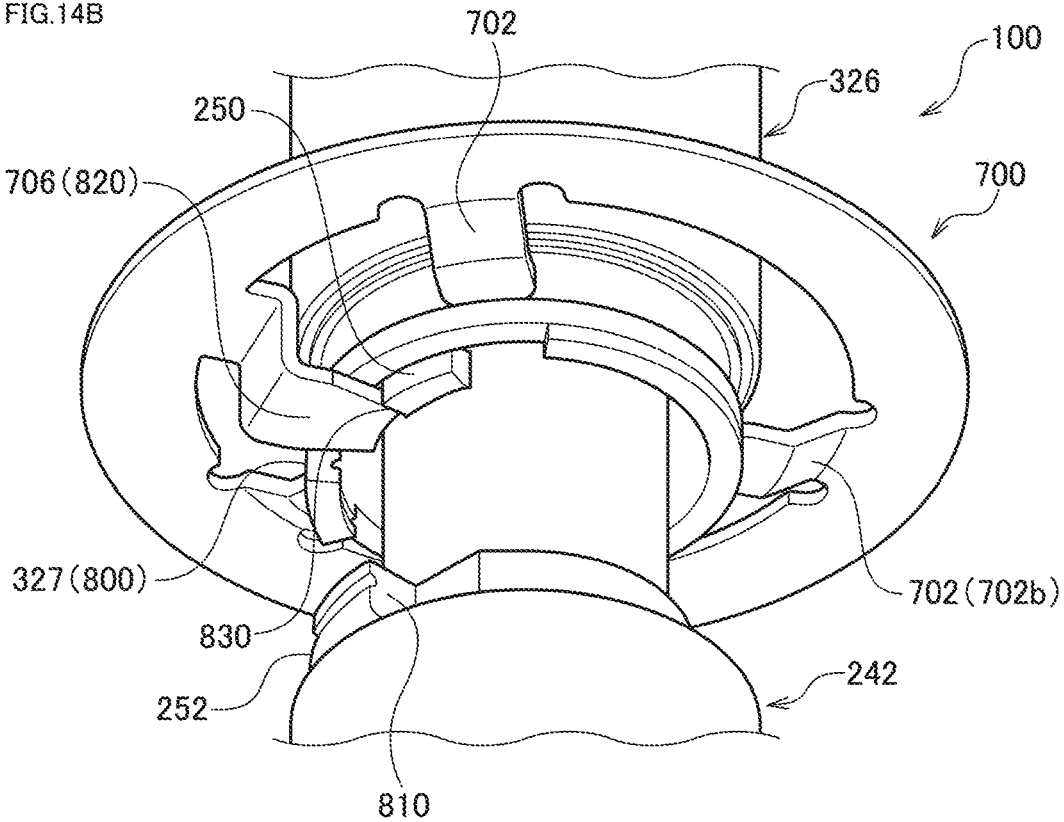

FIGS. 14A and 14B are perspective views of the vicinity of the stopper member 700 in a case where the stopper member 700 is used in the motor operated valve 100. FIG. 14A illustrates a valve closed state, and FIG. 14B illustrates a fully open state.

Figure 15A:
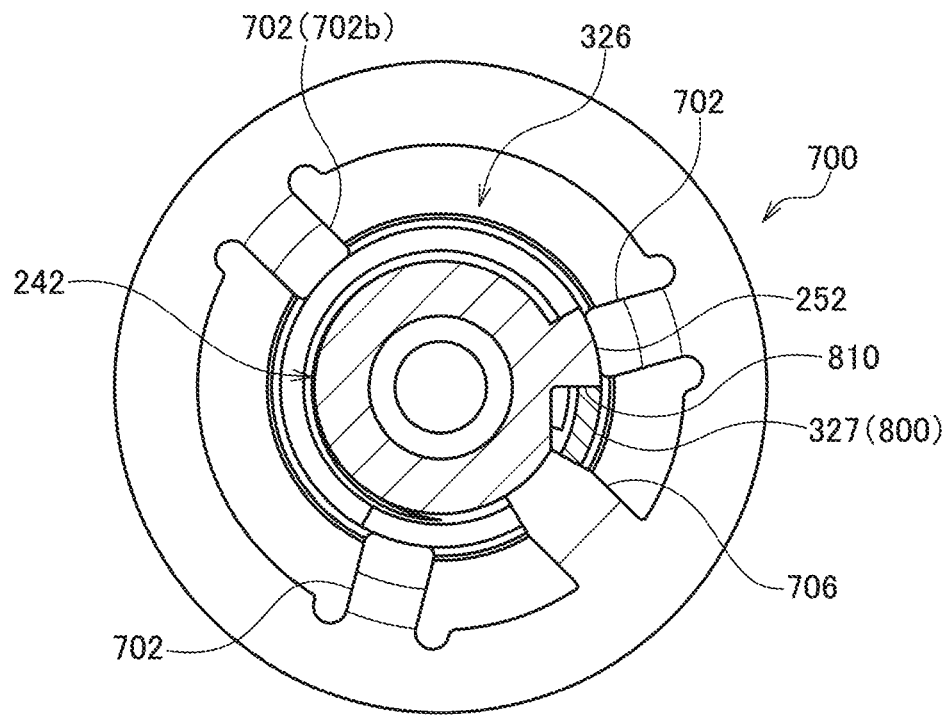
FIGS. 15A and 15B are transverse sectional views of the vicinity of the stopper member in a state in which a stopper mechanism functions.
Figure 15B:
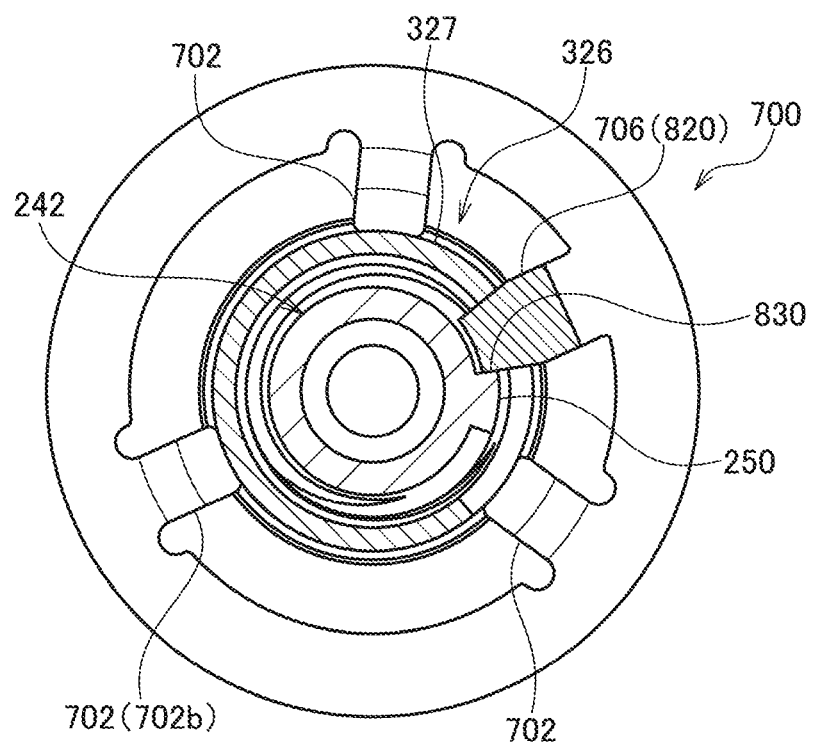

FIGS. 15A and 15B are transverse sectional views of the vicinity of the stopper member 700 in a state in which the stopper mechanism functions as viewed from below. FIG. 15A illustrates the valve closed state, and FIG. 15B illustrates the fully open state.

As illustrated in FIGS. 14A and 15A, in the valve closed state, the projection 327 is sandwiched between the second projection 252 and the sticking out portion 706. Specifically, the projection 327 (stopping portion; second stopper portion 800) is stopped by the stopping face (second stopping face 810) of the second projection 252 in the rotating direction of the rotation shaft 326. This structure restricts the movement of the rotation shaft 326 in the valve closing direction. In addition, as illustrated in FIGS. 14B and 15B, in the fully open state, the sticking out portion 706 is sandwiched between the first projection 250 and the projection 327 (holding portion). Specifically, the sticking out portion 706 (first stopper portion 820) is stopped by the stopping face (first stopping face 830) of the first projection 250 in the rotating direction of the rotation shaft 326. This structure restricts the movement of the rotation shaft 326 in the valve opening direction.

As illustrated in FIGS. 15A and 15B, in the stopper member 700, the fitting portion 702b and the sticking out portion 706 are arranged at intervals of 180 degrees. As a result, even when a force acts on the sticking out portion 706 in the direction in which the sticking out portion 706 fall off the rotation shaft 326 in the fully open state, the fitting portion 702b is pressed against the rotation shaft 326. Thus, the stopper member 700 is prevented from falling off the rotation shaft 326.

Third Embodiment

A third embodiment is different from the first embodiment in the structure of the rotation shaft 326. The following description will focus on the difference from the first embodiment.

Figure 16A:
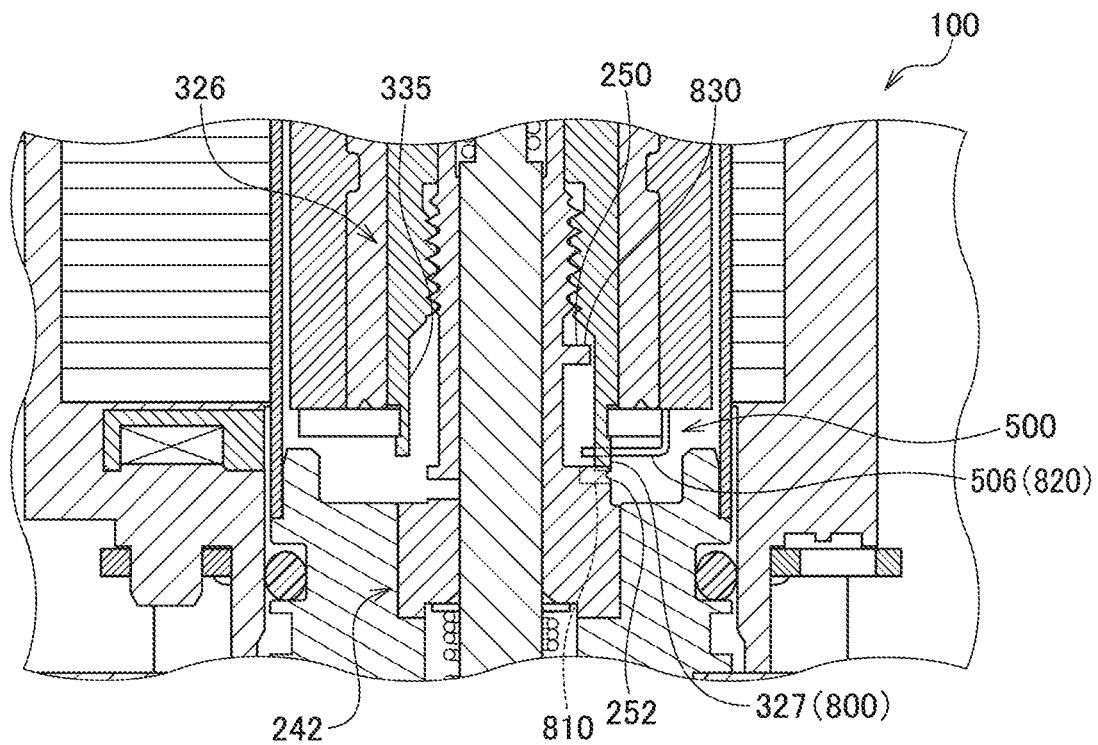
FIGS. 16A and 16B are cross-sectional views of the vicinity of a stopper member of a motor operated valve according to a third embodiment.
Figure 16B:
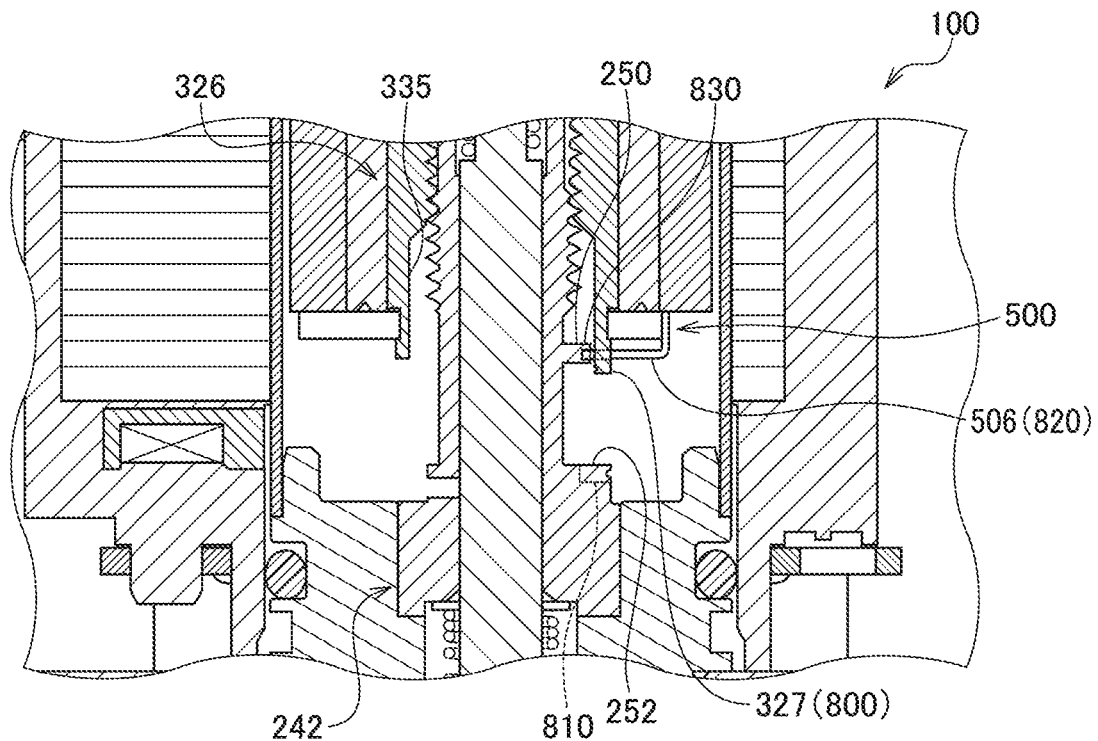

FIGS. 16A and 16B are cross-sectional views of the vicinity of the stopper member 500 of the motor operated valve 100 according to the third embodiment. FIG. 16A illustrates a valve closed state, and FIG. 16B illustrates a fully open state.

FIGS. 17A to 17E illustrate processes of operation of assembling the rotation shaft 326 and the guiding member 242. FIGS. 17A to 17E are transverse sectional views of the vicinity of the stopper member 500 as viewed from below illustrating the operation processes in time sequence. A solid arrow in FIGS. 17A to 17E indicates the rotating direction of the rotation shaft 326 during assembly. A broken line arrow indicates the moving direction of the stopper member 500.

As illustrated in FIGS. 16A and 16B, in the third embodiment, an enlarged-diameter portion 335 of the rotation shaft 326 is larger in diameter than the enlarged-diameter portion 334 in the first embodiment. The assembly of the rotation shaft 326 and the guiding member 242 in the third embodiment is performed after the stopper member 500 is fitted to the rotation shaft 326 in advance. In this assembly, it is necessary to avoid interference between the stopper member 500 and the external thread portion 244. Thus, in the third embodiment, the enlarged-diameter portion 335 has a larger diameter so that the stopper member 500 will not touch the external thread portion 244.

As illustrated in FIGS. 17A to 17E, a sloped portion 254 is formed on a face of the first projection 250 opposite to the stopping face (first stopping face 830) coming in contact with the sticking out portion 506 (first stopper portion 820). The sloped portion 254 makes the outer surface of the guiding member 242 and the circumferential edge of the first projection 250 continuous with each other. The sloped portion 254 is used in assembling the rotation shaft 326 and the guiding member 242 in the third embodiment. Hereinafter, this assembly will be explained with reference to FIGS. 17A to 17E.

The stopper member 500 is mounted in advance on the rotation shaft 326. First, the rotation shaft 326 is mounted around the guiding member 242 until the lower end of the rotation shaft 326 (see FIG. 1) reaches the position of the first projection 250 (FIG. 17A). During the mounting, the protrusion 508 comes in contact with the sloped portion 254 (FIG. 17B). As the rotation shaft 326 is further advanced around the guiding member 242 after the protrusion 508 has come in contact with the sloped portion 254, the sticking out portion 506 comes onto the outer surface of the first projection 250 along the sloped portion 254 (FIG. 17C). As the rotation shaft 326 is further advanced, the sticking out portion 506 passes over the first projection 250 (FIG. 17D). Finally, the rotation shaft 326 and the stopper member 500 are turned in the direction opposite to the direction in which the rotation shaft 326 is mounted around the guiding member 242, and the projection 327 and the sticking out portion 506 come into contact with each other in the turning direction. The sticking out portion 506 is held between the projection 327 (holding portion) and the first projection 250 (FIG. 17E).

As described in relation to FIG. 4, in the first embodiment, the stopper member 500 is mounted after the rotation shaft 326 and the guiding member 242 are assembled. In the third embodiment, because the sloped portion 254 is formed, the rotation shaft 326 and the guiding member 242 can be assembled with the stopper member 500 mounted on the rotation shaft 326 in advance. Thus, the efficiency of assembly of the motor operated valve 100 is improved.

Fourth Embodiment

A fourth embodiment is different from the first embodiment in the position of a second projection 350. The following description will focus on the difference from the first embodiment.

FIGS. 18A and 18B are cross-sectional views of the vicinity of the stopper member 500 of the motor operated valve 100 according to the fourth embodiment. FIG. 18A illustrates a valve closed state, and FIG. 18B illustrates a fully open state.

In the fourth embodiment, the base end of the enlarged-diameter portion 334 is a stepped projection. In the fourth embodiment, the sticking out portion 506 corresponds to a first projection 348, and the projection at the base end of the enlarged-diameter portion 334 corresponds to the second projection 350. As illustrated in FIG. 18A, in the valve closed state, the second projection 350 (second stopper portion 800) and the stopping face (second stopping face 810) of the first projection 250 of the guiding member 242 are in contact with each other in the rotating direction of a rotation shaft 325. Thus, during the valve closing operation, the translational movement of the rotation shaft 325 in the valve closing direction is restricted. In addition, as illustrated in FIG. 18B, in the fully open state, the first projection 348 (first stopper portion 820) and the stopping face (first stopping face 830) of the first projection 250 of the guiding member 242 are in contact with each other in the rotating direction. Thus, during the valve opening operation, the translational movement of the rotation shaft 325 in the valve opening direction is restricted. This structure enables appropriate restriction of the translational movement of the rotation shaft 325.

Fifth Embodiment

A fifth embodiment is different from the first embodiment in that the stopper member 500 is not provided. The following description will be focused on the difference from the first embodiment.

FIGS. 19A to 19C are partially-enlarged cross-sectional views of the vicinity of a stopper mechanism of the motor operated valve 100 according to the fifth embodiment. FIG. 19A illustrates a valve operating state, FIG. 19B illustrates a valve closed state, and FIG. 19C illustrates a valve open state.

In the fifth embodiment, part of the open end portion of a rotation shaft 352 sticks out in the axial direction to constitute a stopper portion 840. The stopper portion 840 serves as both of the first stopper portion and the second stopper portion. The stopper portion 840 is formed by bending the sticking out portion at the open end portion of the rotation shaft 352. The formation of the stopper portion 840 will be described later in detail.

In the valve closed state, one end face of the stopper portion 840 in the rotating direction is stopped by the stopping face (second stopping face 810) of the second projection 252. This structure restricts the movement of the rotation shaft 352 in the valve closing direction (downward). In addition, in the fully open state, the other end face of the stopper portion 840 in the rotating direction is stopped by the stopping face (first stopping face 830) of the first projection 250. This structure restricts the movement of the rotation shaft 352 in the valve opening direction (upward).

Figures 20A, 20B, 20C:
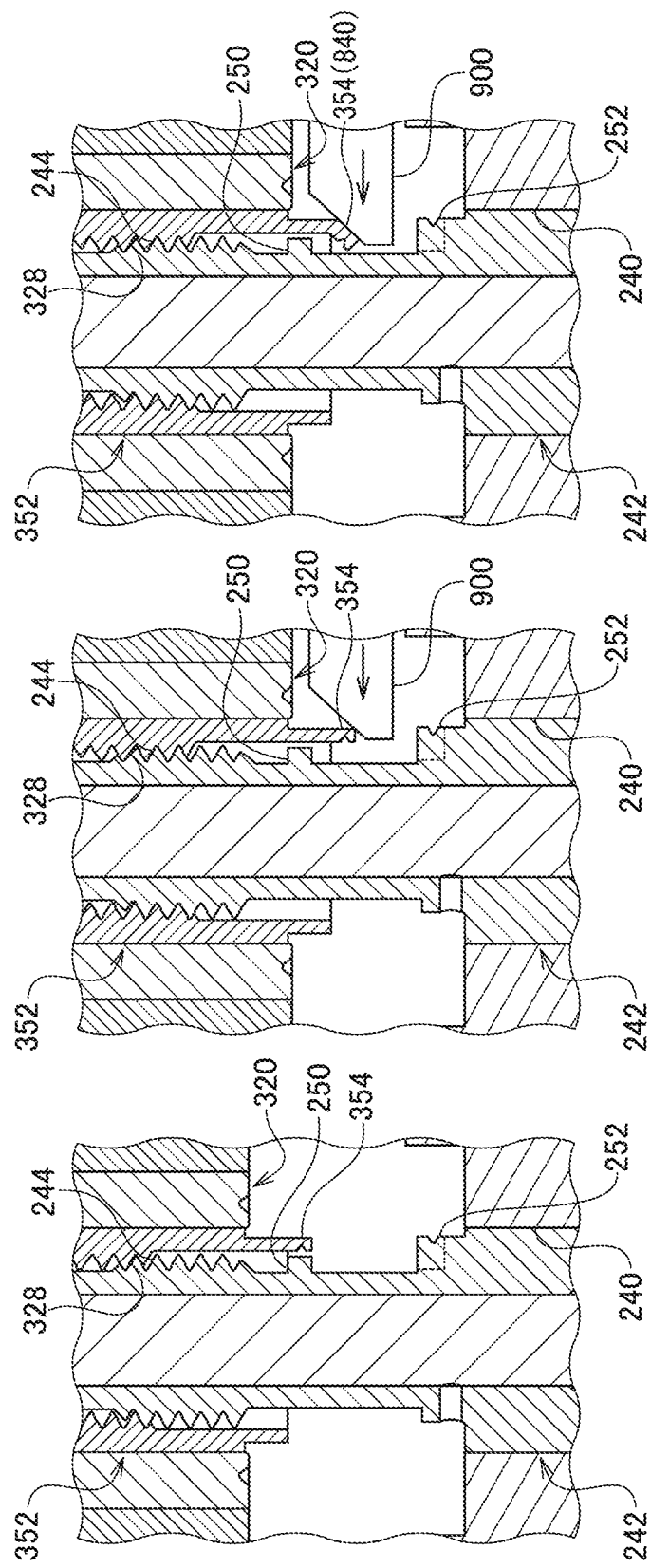
FIGS. 20A to 20C are conceptual diagrams illustrating processes of formation of a stopper portion.

FIGS. 20A to 20C are conceptual diagram illustrating processes of formation of the stopper portion 840. All of FIGS. 20A to 20C illustrate states before the can 302 is mounted on the second body 240. FIG. 20A illustrates a state in which the external thread portion 244 and the internal thread portion 328 are started to be engaged with each other, FIG. 20B illustrates a state before the stopper portion 840 is machined, and FIG. 20C illustrates a state after the stopper portion 840 is machined. An arrow illustrated in FIGS. 20B and 20C indicates the direction in which a tool 900 is inserted.

First, the external thread portion 244 and the internal thread portion 328 are engaged with each other, so that the rotation shaft 352 is mounted on the guiding member 242. As illustrated in FIG. 20B, after a sticking out portion 354 at the open end portion of the rotation shaft 352 is brought to a position at a height between the first projection 250 and the second projection 252 in the axial direction, the tool 900 is inserted between the rotor 320 and the second body 240. The tool 900 is brought in contact with the lower end portion of the sticking out portion 354, and the tool 900 is then pressed in the radial direction of the rotation shaft 352 to bend the sticking out portion 354 (FIG. 20C). The bent sticking out portion 354 constitutes the stopper portion 840. The stopper portion 840 can also be referred to as a "bent portion" at the open end portion of the rotation shaft 352.

In the fifth embodiment, the bent portion at the open end portion of the rotation shaft 352 constitutes the stopper portion 840. This structure eliminates the need of the stopper member, which reduces the number of components of the motor operated valve 100. In addition, because the stopper portion 840 is formed integrally with the rotation shaft 352, the position of the stopper portion 840 on the rotation shaft 352 can be easily managed.

In the fifth embodiment as well, the first stopping face 830 and the second stopping face 810 are located between the screwed portion and the valve section 202. In addition, the screwed portion of the feed screw mechanism and the rotor 320 are located at the same height in the axial direction. Thus, the distance between the center of gravity and the support point of the rotor 320 can be made shorter, and whirling of the rotor 320 due to the rotation of the rotor 320 is suppressed.

In the fifth embodiment as well, the first projection 250 (first stopping face 830) is located inside the enlarged-diameter portion 334 depending on the position of the rotor 320 in the translation direction (the driving state of the rotor 320). Specifically, because the first stopping face 830 is present under the rotation shaft 352 of the rotor 320, the total length of the rotor 320, the first stopper mechanism, and the second stopper mechanism in the axial direction can be made shorter. Thus, the length of the motor operated valve 100 in the axial direction can be made shorter.

The embodiments of the present invention has been described above. The present invention is not limited to the embodiments and it will be obvious to those skilled in the art that various modifications could be further developed within the technical idea underlying the present invention.

In the first to fourth embodiments described above, a stepped portion is formed at the lower end of the rotation shaft. In a modification, any structure in which the sticking out portion of the stopper member can be formed radially inward from the inner surface of the rotation shaft may be used. For example, a hole into which the sticking out portion is inserted may be formed near the open end of the rotation shaft. Alternatively, a hole may be formed at another portion of the rotation shaft depending on the position of the stopper member in the axial direction.

In the first to fourth embodiments described above, the projection and the second projection come into contact with each other to restrict the translational movement of the rotation shaft. In a modification, a portion at the open end of the rotation shaft other than the projection may come into contact with the second projection in the rotating direction of the rotor. In this case as well, the movement of the rotation shaft in the axial direction can be restricted.

In the first to fourth embodiments described above, the protrusion is sandwiched between the projection and the guiding member in the radial direction. In a modification, the protrusion may be inserted between a portion at the open end of the rotation shaft other than projection and the guiding member. In this case as well, the stopper member is prevented from falling off the rotation shaft.

In the fifth embodiment described above, the stopper portion 840 serves as both of the first stopper portion and the second stopper portion. In a modification, two stopper portions may be formed. Specifically, two portions (sticking out portions) protruding from the open end of the rotation shaft in the axial direction may be formed at positions away from each other, and bent. One of the bent portions (stopper portions) of the sticking out portions may be the first stopper portion, and the other may be the second stopper portion. In this manner, the functions of the stopper portion 840 may be separated into the function during upward movement of the rotation shaft and that during downward movement thereof.

In the embodiments described above, the motor operated valve in which the valve element touches and leaves the valve seat and the valve section is completely closed in the valve closed state has been described. In a modification, a valve element may be moved into and out of a valve hole like a so-called spool valve, and a slight leakage of fluid may be permitted in the valve closed state.

While the motor operated valve is a motor operated expansion valve in the embodiment described above, the motor operated valve may be an on-off valve or a flow control valve without an expanding function.

In the embodiments described above, the structure in which the valve element and the shaft are integrally formed has been described. In a modification, the structure is not limited thereto, and the valve element and the shaft may be separate members that can move integrally. In this case, the valve element and the shaft may be structurally integrated. Alternatively, the valve element and the shaft may be integrally movable, and also movable relative to each other. For example, the valve element and the shaft may be integrally movable while the valve is being opened, and may be movable relative to each other during valve closing operation, like the motor operated valve described in Japanese Patent Application Publication No. 2016-205584.

In the embodiments described above, the first projection is integrally formed with the guiding member. In a modification, the first projection and the guiding member may be separate members that are integrally fixed.

In the embodiments described above, the notch 253 is formed after machining of the external thread portion 244, and the notch 301 is formed before machining of the internal thread portion 328. In a modification, the notch 253 may be formed before machining of the external thread portion 244, and the notch 301 may be formed after machining of the internal thread portion 328. In any case, the tool used for machining of the external thread portion or the internal thread portion is used, and the movement of the working tool and the rotation of the machined member are maintained to form the notches. As a result, the distance L1 and the distance L2 can be set to integer multiples of the pitch P.

In the embodiments described above, the structure in which the notches are formed on the projection of the rotation shaft and the second projection of the guiding member has been described. In a modification, the notches may be formed on other portions such as at a position, away from the stopper portion, on the enlarged-diameter portion of the rotation shaft or at a position, away from the stopping face, of the large-diameter portion of the guiding member.

In the embodiments described above, the cross-section in which the distance L1 is defined is present on a plane including the second stopping face 810 (intersection 253a) and the axis C1. In a modification, the cross-section may be on a plane including another position of the notch 253 and the axis C1. In addition, in the embodiments described above, the cross-section in which the distance L2 is defined is present on a plane including the second stopper portion 800 (intersection 301a) and the axis C2. In a modification, the cross-section may be on a plane including another position of the notch 301 and the axis C2.

In the embodiments described above, the distance L1 and the distance L2 are set to integer multiples of the pitch P. In a modification, the distance L1 and the distance L2 may be integer multiples of ½ of the pitch (½P) based on the roots and the crests of the thread portions. In this case as well, the design of the rotation shaft and the guiding member so that the contact face and the second stopping face come in contact with each other can be made simpler by determining the distance between the notches and the roots of the thread portions.

In the embodiments described above, the structure in which the rotor and the stator have an equal length in the axial direction has been described. In a modification, the rotor and the stator may have different length, such as the stator is longer than the rotor in the axial direction. In this case as well, the thrust for lifting the valve element in the valve opening direction from the valve closed state can be increased by setting the relative positions of the rotor and the stator so that the area in which the rotor and the stator face each other is maximum when the valve is closed.

In the embodiments described above, the structure in which the stopper portion is stopped in the rotating direction by the first projection or the second projection has been described. In a modification, the stopper portion and the stopping face may be brought into contact in the axial direction of the rotor. For example, in the first embodiment (FIGS. 5A to 5D), the first stopper mechanism may be such that the upper face of the sticking out portion 506 is stopped by the lower face of the first projection 250. In addition, the second stopper mechanism may be such that the lower face of the sticking out portion 506 is stopped by the upper face of the second projection 252. The relative position of the sticking out portion 506 in the stopper member 500 may be set so that such a stopper structure is achieved. In addition, in the fifth embodiment (FIGS. 19A to 19C), the stopper portion 840 may be bent at a right angle with respect to the inner surface of the rotation shaft 352, and the upper face and the lower face of the stopper portion 840 may be stopped by the first projection 250 and the second projection 252, respectively. The same applies to the second to fourth embodiments.

In the embodiments described above, the structure in which the first body 220, the second body 240, and the third body 260 constitute the body of the motor operated valve, and the motor unit 300 is fixed to these three bodies has been presented as an example of the motor operated valve. In a modification, a structure in which the second body 240 and the third body 260 constitute the body (valve body) of the motor operated valve, and the motor unit 300 is fixed to the second body 240 and the third body 260 may be a "motor operated valve". In this case, the first body 220 constitutes a "piping body".

The present invention is not limited to the above-described embodiments and modifications only, and the components may be further modified to arrive at various other embodiments without departing from the scope of the invention. Various other embodiments may be further formed by combining, as appropriate, a plurality of structural components disclosed in the above-described embodiments and modifications. Furthermore, one or some of all of the components exemplified in the above-described embodiments and modifications may be left unused or removed.

What is claimed is:

1. A motor operated valve comprising:
   a body including an inflow port through which fluid is introduced from an upstream side, an outflow port through which the fluid is delivered to a downstream side, and a passage through which the inflow port and the outflow port communicate with each other;
   a valve element to open and close a valve section provided on the passage;
   a motor including a rotor for driving the valve element in opening and closing directions of the valve section;
   a feed screw mechanism to convert rotational movement of the rotor into translational movement; and
   a stopper mechanism to restrict the translational movement of the rotor, wherein
   the feed screw mechanism includes:
      a guiding part mounted vertically on the body, and including an external thread portion on an outer surface thereof; and
      a guided part made of a cylindrical member constituting a rotation shaft of the rotor, including an internal thread portion on an inner surface thereof, and mounted around and thus supported by the guiding part, the internal thread portion being engaged with the external thread portion,
   the stopper mechanism includes:
      a stopper portion provided on the guided part; and
      a stopping face formed integrally with the guiding part, and
   when the valve element is driven by the motor to move in a valve closing direction, the stopping face stops the stopper portion to restrict the movement of the rotor in the valve closing direction,
   the stopper portion sticks out from an open end portion of the guided part in an axial direction of the rotor,
   when the valve element is driven by the motor to move in the valve closing direction, the stopper portion is stopped by the stopping face in a rotating direction of the rotor, so that the movement of the rotor in the valve closing direction is restricted,
   the guiding part is made of a metal material by cutting, and
   a first notch for phase management of the external thread portion is formed on an outer surface of the guiding part at a position of the stopping face.

2. The motor operated valve according to claim 1, wherein in a part of a plane including the first notch and an axis of the guiding part, the part including the first notch with respect to the axis, a distance in the axial direction between the first notch and a root of the external thread portion is an integer multiple of a thread pitch.

3. The motor operated valve according to claim 1, wherein the guided part is made of a metal material by cutting, the stopper portion is formed integrally with the guided part, and
   a second notch for phase management of the internal thread portion is formed on an inner surface of the guided part at a position of a face thereof coming in contact with the stopping face.

4. A motor operated valve comprising:
   a body including an inflow port through which fluid is introduced from an upstream side, an outflow port through which the fluid is delivered to a downstream side, and a passage through which the inflow port and the outflow port communicate with each other;
   a valve element to open and close a valve section provided on the passage;
   a motor including a rotor for driving the valve element in opening and closing directions of the valve section;
   a feed screw mechanism to convert rotational movement of the rotor into translational movement; and
   a stopper mechanism to restrict the translational movement of the rotor, wherein
   the feed screw mechanism includes:
      a guiding part mounted vertically on the body, and including an external thread portion on an outer surface thereof; and
      a guided part made of a cylindrical member constituting a rotation shaft of the rotor, including an internal thread portion on an inner surface thereof, and mounted around and thus supported by the guiding part, the internal thread portion being engaged with the external thread portion,
   the stopper mechanism includes:
      a stopper portion provided on the guided part; and
      a stopping face formed integrally with the guiding part, and
   when the valve element is driven by the motor to move in a valve closing direction, the stopping face stops the stopper portion to restrict the movement of the rotor in the valve closing direction,
   the stopper portion sticks out from an open end portion of the guided part in an axial direction of the rotor,
   when the valve element is driven by the motor to move in the valve closing direction, the stopper portion is stopped by the stopping face in a rotating direction of the rotor, so that the movement of the rotor in the valve closing direction is restricted,
   the motor includes a stator for driving the rotor in the opening and closing directions of the valve section, and
   an area in which the rotor and the stator face each other is maximum when the stopper portion is stopped by the stopping face.

5. The motor operated valve according to claim 4, wherein the valve element has a pressure receiving structure that receives a pressure of the fluid in the valve closing direction when the valve section is closed.

* * * * *